(12) United States Patent
Lax et al.

(10) Patent No.: US 8,054,194 B2
(45) Date of Patent: Nov. 8, 2011

(54) SYSTEM AND METHOD FOR VERIFYING A SECURITY STATUS OF A LOCKABLE CONTAINER

(75) Inventors: Michael R. Lax, Syosset, NY (US); Timothy Keuning, Northport, NY (US); Frederik van Koot, Halesite, NY (US)

(73) Assignee: Autronic Plastics, Inc., Westbury, NY (US)

( * ) Notice: Subject to any disclaimer, the term of this patent is extended or adjusted under 35 U.S.C. 154(b) by 1725 days.

(21) Appl. No.: 11/285,860

(22) Filed: Nov. 23, 2005

(65) Prior Publication Data

US 2006/0116899 A1 Jun. 1, 2006

Related U.S. Application Data

(63) Continuation-in-part of application No. 10/776,583, filed on Feb. 10, 2004, now abandoned.

(60) Provisional application No. 60/446,386, filed on Feb. 10, 2003, provisional application No. 60/487,467, filed on Jul. 14, 2003, provisional application No. 60/630,452, filed on Nov. 23, 2004, provisional application No. 60/644,197, filed on Jan. 13, 2005, provisional application No. 60/730,585, filed on Oct. 26, 2005.

(51) Int. Cl.
*G08B 21/00* (2006.01)

(52) U.S. Cl. ............... 340/686.1; 340/686.6; 340/545.3; 340/568.1; 340/568.8; 340/600; 70/57.1; 70/63; 70/77

(58) Field of Classification Search ............... 340/686.1, 340/686.6, 545.3, 568.1, 568.8, 600; 70/57.1, 70/63, 77
See application file for complete search history.

(56) References Cited

U.S. PATENT DOCUMENTS

| 517,729 | A | 4/1894 | Cable |
| 1,626,898 | A | 5/1927 | Welk |
| 1,707,225 | A | 4/1929 | Jackson |
| 2,393,034 | A | 1/1946 | Ellis et al. |
| 2,730,392 | A | 1/1956 | Thiebaud et al. |
| 2,809,062 | A | 10/1957 | Mainhardt et al. |

(Continued)

FOREIGN PATENT DOCUMENTS

CN 1093055 10/1994

(Continued)

OTHER PUBLICATIONS

PCT Search Report from PCT/US2005/042536, dated Apr. 4, 2006.

(Continued)

*Primary Examiner* — Tai T Nguyen
(74) *Attorney, Agent, or Firm* — Zollinger & Burleson Ltd.

(57) ABSTRACT

Apparatus and methods for processing assets in a lockable container are disclosed. A decoupler receives information from the container or the asset in the container. The container may be associated with a security status, and the item may be associated with a processing status. The decoupler may move the container along a processing path in a sequence based on the security status of the container and/or the processing status of the asset. The decoupler may also lock or unlock the container while moving the container along the processing path. At least a portion of the processing path may be exposed to a magnetic field, which may lock or unlock the container and/o activate or deactivate a security tag associated with the container or the item. The decoupler may also write or read information to or from an RFID tag associated with the container and/or the asset. This information may be used in conjunction with benefit denial, audit, loss prevention, transaction management, and other similar systems.

20 Claims, 16 Drawing Sheets

U.S. PATENT DOCUMENTS

| | | |
|---|---|---|
| 2,825,483 A | 3/1958 | Maron, Jr. |
| 2,916,901 A | 12/1959 | Claud-Mantle |
| 3,095,723 A | 7/1963 | McKnight et al. |
| 3,230,749 A | 1/1966 | Manthorne |
| 3,232,421 A | 2/1966 | Young |
| 3,495,716 A | 2/1970 | Gregory |
| 3,497,908 A | 3/1970 | Zamarra |
| 3,515,423 A | 6/1970 | De Smidt |
| 3,685,684 A | 8/1972 | Schindler et al. |
| 3,763,994 A | 10/1973 | Somers |
| 3,828,922 A | 8/1974 | Holkestad |
| 3,837,525 A | 9/1974 | Kobayashi |
| 3,837,692 A | 9/1974 | Ayers et al. |
| 3,855,827 A | 12/1974 | Hallman et al. |
| 3,885,670 A | 5/1975 | Cousino |
| 3,904,259 A | 9/1975 | Hoffmann et al. |
| 3,933,240 A | 1/1976 | Humble |
| 3,933,381 A | 1/1976 | Schurman |
| 3,949,928 A | 4/1976 | Perkins |
| 3,951,264 A | 4/1976 | Heidecker et al. |
| 3,969,007 A | 7/1976 | Lowry |
| 3,994,416 A | 11/1976 | Mulligan |
| 3,994,551 A | 11/1976 | Ackeret |
| 4,046,255 A | 9/1977 | Ackeret |
| 4,084,690 A | 4/1978 | Pulse |
| 4,084,694 A | 4/1978 | Lainez et al. |
| 4,109,821 A | 8/1978 | Lutz |
| 4,153,178 A | 5/1979 | Weavers et al. |
| 4,176,744 A | 12/1979 | Borzak |
| RE30,184 E | 1/1980 | Ackeret |
| 4,184,594 A | 1/1980 | Hehn |
| 4,191,292 A | 3/1980 | Schweizer |
| 4,204,724 A | 5/1980 | Bauer et al. |
| 4,211,337 A | 7/1980 | Weavers et al. |
| 4,235,334 A | 11/1980 | Ahn |
| 4,239,108 A | 12/1980 | Coleman et al. |
| 4,266,784 A | 5/1981 | Torrington |
| 4,279,373 A | 7/1981 | Montealegre |
| 4,285,429 A | 8/1981 | MacTavish |
| 4,291,801 A | 9/1981 | Basili et al. |
| 4,293,266 A | 10/1981 | St. Lawrence et al. |
| 4,303,159 A | 12/1981 | Stone et al. |
| 4,314,637 A | 2/1982 | Posso |
| 4,314,643 A | 2/1982 | Forbes, Jr. |
| 4,341,307 A | 7/1982 | Shyers |
| 4,363,403 A | 12/1982 | Raucci, Jr. |
| 4,365,711 A | 12/1982 | Long et al. |
| 4,365,712 A | 12/1982 | Oishi et al. |
| 4,379,507 A | 4/1983 | Llabres |
| 4,387,807 A | 6/1983 | De la Rosa |
| 4,399,913 A | 8/1983 | Gelardi et al. |
| 4,406,369 A | 9/1983 | Wallace et al. |
| 4,407,410 A | 10/1983 | Graetz et al. |
| 4,425,999 A | 1/1984 | MacDonald et al. |
| 4,445,634 A | 5/1984 | Sato |
| 4,453,390 A | 6/1984 | Moritz |
| 4,453,743 A | 6/1984 | Sanders et al. |
| 4,463,849 A | 8/1984 | Prusak et al. |
| 4,463,850 A | 8/1984 | Gorog |
| 4,469,225 A | 9/1984 | Takahashi |
| 4,476,978 A | 10/1984 | Saito |
| 4,488,644 A | 12/1984 | Wynalda |
| 4,501,359 A | 2/1985 | Yoshizawa |
| 4,508,217 A | 4/1985 | Long et al. |
| 4,522,312 A | 6/1985 | Rathgeber et al. |
| 4,538,730 A | 9/1985 | Wu |
| 4,558,782 A | 12/1985 | Iverson et al. |
| 4,561,544 A | 12/1985 | Reeve |
| 4,572,369 A | 2/1986 | Morris |
| 4,589,549 A | 5/1986 | Hehn |
| 4,609,105 A | 9/1986 | Manes et al. |
| 4,613,044 A | 9/1986 | Saito et al. |
| 4,617,655 A | 10/1986 | Aldenhoven |
| 4,627,534 A | 12/1986 | Komiyama et al. |
| 4,635,797 A | 1/1987 | Bankier |
| 4,643,301 A | 2/1987 | Hehn et al. |
| 4,658,955 A | 4/1987 | Eichner |
| 4,674,303 A | 6/1987 | Salcone, II |
| 4,676,370 A | 6/1987 | Rudick |
| 4,678,080 A | 7/1987 | Nelson |
| 4,685,558 A | 8/1987 | Filiz et al. |
| 4,702,369 A | 10/1987 | Philosophe |
| 4,703,853 A | 11/1987 | Byrns |
| 4,705,166 A | 11/1987 | Ackeret |
| 4,709,813 A | 12/1987 | Wildt |
| 4,717,021 A | 1/1988 | Ditzig |
| 4,718,547 A | 1/1988 | MacTavish |
| 4,722,439 A | 2/1988 | Grobecker et al. |
| 4,724,957 A | 2/1988 | Burgschweiger |
| 4,733,916 A | 3/1988 | Seufert |
| 4,747,484 A | 5/1988 | Ackeret |
| 4,750,618 A | 6/1988 | Schubert |
| 4,753,347 A | 6/1988 | Bellante et al. |
| 4,759,442 A | 7/1988 | Gregerson et al. |
| 4,772,877 A | 9/1988 | Rice |
| 4,784,264 A | 11/1988 | Sykes |
| 4,793,479 A | 12/1988 | Otsuka et al. |
| 4,802,601 A | 2/1989 | Pijanowski et al. |
| 4,805,769 A | 2/1989 | Soltis et al. |
| 4,805,770 A | 2/1989 | Grobecker et al. |
| 4,807,749 A | 2/1989 | Ackeret |
| 4,811,000 A | 3/1989 | Humphrey et al. |
| 4,819,797 A | 4/1989 | Holmgren |
| 4,834,238 A | 5/1989 | Hehn et al. |
| 4,838,420 A | 6/1989 | Collett et al. |
| 4,860,897 A | 8/1989 | Fowler et al. |
| 4,871,064 A | 10/1989 | Hehn et al. |
| 4,921,097 A | 5/1990 | Finke et al. |
| 4,928,825 A | 5/1990 | Hehn |
| 4,941,588 A | 7/1990 | Flider |
| 4,947,989 A | 8/1990 | Horton |
| 4,962,854 A | 10/1990 | Ricci |
| 4,966,020 A | 10/1990 | Fotheringham et al. |
| 4,972,690 A | 11/1990 | O'Sullivan |
| 4,974,740 A | 12/1990 | Niles et al. |
| 4,987,639 A | 1/1991 | Baiuley et al. |
| 4,987,999 A | 1/1991 | Hehn |
| 4,988,000 A | 1/1991 | Weisburn et al. |
| 5,007,256 A | 4/1991 | Lowe |
| 5,011,010 A | 4/1991 | Francis et al. |
| 5,016,752 A | 5/1991 | Haugen |
| 5,039,982 A | 8/1991 | Bruhwiler |
| 5,076,460 A | 12/1991 | Hussell |
| 5,081,446 A | 1/1992 | Gill et al. |
| 5,085,322 A | 2/1992 | Lax |
| D324,337 S | 3/1992 | Brady |
| 5,103,978 A | 4/1992 | Secor |
| 5,145,068 A | 9/1992 | Schmitz et al. |
| 5,147,034 A | 9/1992 | Broadhead et al. |
| 5,161,907 A | 11/1992 | Byrne |
| 5,191,983 A | 3/1993 | Hardy |
| 5,193,371 A | 3/1993 | Yamane |
| 5,195,595 A | 3/1993 | Nakagawa |
| 5,205,401 A | 4/1993 | Weisburn et al. |
| 5,205,405 A | 4/1993 | O'Brien et al. |
| 5,209,086 A | 5/1993 | Bruhwiler |
| 5,211,283 A | 5/1993 | Weisburn et al. |
| 5,213,209 A | 5/1993 | Song |
| 5,215,188 A | 6/1993 | Wittman |
| 5,219,417 A | 6/1993 | O'Brien et al. |
| 5,236,081 A | 8/1993 | Fitzsimmons et al. |
| 5,244,085 A | 9/1993 | Lammerant et al. |
| 5,249,677 A | 10/1993 | Lim |
| 5,250,801 A | 10/1993 | Grozinger |
| 5,251,750 A | 10/1993 | Gelardi et al. |
| 5,253,751 A | 10/1993 | Wipper |
| 5,259,498 A | 11/1993 | Weisburn et al. |
| 5,285,918 A | 2/1994 | Weisburn et al. |
| D347,320 S | 5/1994 | Du Corday |
| 5,359,809 A | 11/1994 | Johnson |
| 5,360,107 A | 11/1994 | Chasin et al. |
| 5,366,074 A | 11/1994 | O'Brien et al. |
| 5,368,162 A | 11/1994 | Holmgren |
| 5,375,712 A | 12/1994 | Weisburn |
| 5,377,825 A | 1/1995 | Sykes et al. |
| 5,377,827 A | 1/1995 | Roth et al. |
| 5,384,103 A | 1/1995 | Miller |

| | | |
|---|---|---|
| 5,390,515 A | 2/1995 | Essick |
| 5,400,902 A | 3/1995 | Kaminski |
| 5,417,324 A | 5/1995 | Joyce et al. |
| D358,961 S | 6/1995 | Lax |
| 5,460,266 A | 10/1995 | Mundorf et al. |
| 5,462,159 A | 10/1995 | Roth et al. |
| 5,494,156 A | 2/1996 | Nies |
| 5,499,714 A | 3/1996 | Konno |
| 5,505,299 A | 4/1996 | Ditzig et al. |
| 5,515,968 A | 5/1996 | Taniyama |
| 5,524,752 A | 6/1996 | Mazzucchelli |
| 5,526,926 A | 6/1996 | Deja |
| 5,528,914 A | 6/1996 | Nguyen et al. |
| 5,529,182 A | 6/1996 | Anderson et al. |
| 5,533,619 A | 7/1996 | Ziegler |
| 5,551,559 A | 9/1996 | Roth et al. |
| 5,551,560 A | 9/1996 | Weisburn et al. |
| 5,586,651 A | 12/1996 | Krummenacher |
| 5,588,315 A | 12/1996 | Holmgren |
| 5,593,030 A | 1/1997 | Tell |
| 5,593,031 A | 1/1997 | Uchida |
| 5,597,068 A | 1/1997 | Weisburn et al. |
| 5,598,728 A | 2/1997 | Lax |
| 5,601,188 A | 2/1997 | Dressen et al. |
| 5,609,249 A | 3/1997 | Cheng |
| 5,626,225 A | 5/1997 | Joyce, Jr. |
| 5,636,535 A | 6/1997 | Shimada |
| 5,636,737 A | 6/1997 | Marsilio |
| 5,653,335 A | 8/1997 | Bauer et al. |
| 5,660,274 A | 8/1997 | Chien |
| 5,662,218 A | 9/1997 | Ladwig |
| 5,680,782 A | 10/1997 | Komatsu et al. |
| 5,685,425 A | 11/1997 | Choi |
| 5,685,427 A | 11/1997 | Kuitems et al. |
| 5,690,224 A | 11/1997 | Koizumi |
| 5,697,496 A | 12/1997 | Bauer |
| 5,717,533 A | 2/1998 | Poplawski et al. |
| 5,727,680 A | 3/1998 | Liu |
| 5,730,283 A | 3/1998 | Lax |
| 5,760,689 A | 6/1998 | Holmgren |
| 5,762,187 A | 6/1998 | Belden, Jr. et al. |
| 5,768,922 A | 6/1998 | Lax |
| 5,769,217 A | 6/1998 | Derraugh et al. |
| 5,769,218 A | 6/1998 | Yabe |
| 5,772,028 A | 6/1998 | Marsilio et al. |
| 5,775,491 A | 7/1998 | Taniyama |
| 5,775,500 A | 7/1998 | Williams |
| 5,777,884 A | 7/1998 | Belka et al. |
| 5,782,348 A | 7/1998 | Burdett |
| 5,782,350 A | 7/1998 | Weisburn et al. |
| 5,788,068 A | 8/1998 | Fraser et al. |
| 5,799,784 A | 9/1998 | Bosworth |
| 5,823,341 A | 10/1998 | Nakasuji |
| 5,829,582 A | 11/1998 | Ippolito et al. |
| 5,829,584 A | 11/1998 | Raucci, Jr. |
| 5,839,576 A | 11/1998 | Kim |
| 5,850,752 A | 12/1998 | Lax |
| 5,887,713 A | 3/1999 | Smith et al. |
| 5,890,590 A | 4/1999 | Doodson |
| 5,896,985 A | 4/1999 | Nakasuji |
| 5,896,986 A | 4/1999 | Bolognia et al. |
| 5,899,327 A | 5/1999 | Sykes |
| 5,901,840 A | 5/1999 | Nakasuji |
| 5,904,246 A | 5/1999 | Weisburn et al. |
| 5,906,275 A | 5/1999 | Jokic |
| D411,071 S | 6/1999 | Cerda-Vicedo |
| 5,910,770 A | 6/1999 | Ohara |
| 5,918,909 A | 7/1999 | Fiala et al. |
| 5,931,291 A | 8/1999 | Sedon et al. |
| 5,931,294 A | 8/1999 | Weingarden et al. |
| 5,934,114 A | 8/1999 | Weisburn et al. |
| 5,941,382 A | 8/1999 | Fantone et al. |
| 5,944,181 A | 8/1999 | Lau |
| 5,944,185 A | 8/1999 | Burdett et al. |
| 5,950,822 A | 9/1999 | Cloran et al. |
| 5,960,949 A | 10/1999 | Wynalda, Jr. |
| 5,975,298 A | 11/1999 | Sankey et al. |
| 5,984,388 A | 11/1999 | Bacon |
| 5,988,375 A | 11/1999 | Chang |
| 5,988,376 A | 11/1999 | Lax |
| 5,996,788 A | 12/1999 | Belden, Jr. et al. |
| 5,996,815 A | 12/1999 | Walters et al. |
| 6,000,541 A | 12/1999 | Yu |
| 6,016,909 A | 1/2000 | Chang |
| D420,240 S | 2/2000 | Sorenson et al. |
| 6,021,894 A | 2/2000 | Lakoski et al. |
| D422,445 S | 4/2000 | Markowitz |
| 6,047,821 A | 4/2000 | Hashimoto et al. |
| 6,056,117 A | 5/2000 | Courchesne |
| 6,059,102 A | 5/2000 | Gelardi et al. |
| 6,065,593 A | 5/2000 | Howerton et al. |
| 6,065,594 A | 5/2000 | Sankey et al. |
| D426,978 S | 6/2000 | Belden, Jr. et al. |
| 6,085,900 A | 7/2000 | Wong |
| 6,092,650 A | 7/2000 | Budnik |
| 6,102,200 A | 8/2000 | Dressen et al. |
| D430,424 S | 9/2000 | Belden, Jr. et al. |
| 6,119,857 A | 9/2000 | Stumpff |
| 6,123,192 A | 9/2000 | Rufo, Jr. |
| 6,125,668 A | 10/2000 | Belden, Jr. |
| 6,135,280 A | 10/2000 | Burdett |
| 6,164,445 A | 12/2000 | Cooper |
| 6,170,656 B1 | 1/2001 | Cerda-Vilaplana et al. |
| D437,520 S | 2/2001 | Choi |
| 6,182,480 B1 | 2/2001 | Kim |
| 6,196,384 B1 | 3/2001 | Belden, Jr. |
| 6,222,453 B1 | 4/2001 | Joyce |
| 6,283,280 B1 | 9/2001 | Wong et al. |
| 6,354,435 B1 | 3/2002 | Belden, Jr. et al. |
| 6,374,648 B1 | 4/2002 | Mitsuyama |
| 6,398,022 B1 | 6/2002 | Mou et al. |
| 6,401,920 B2 | 6/2002 | Gelardi |
| 6,411,215 B1 | 6/2002 | Shiner |
| 6,412,631 B2 | 7/2002 | Belden, Jr. |
| 6,422,387 B1 | 7/2002 | Sedon et al. |
| 6,430,976 B1 | 8/2002 | Mitsuyama |
| 6,443,300 B1 | 9/2002 | Gelardi et al. |
| 6,474,470 B1 | 11/2002 | Byrne et al. |
| 6,474,478 B1 | 11/2002 | Huehner et al. |
| 6,516,639 B1 | 2/2003 | Margetts et al. |
| 6,516,945 B2 | 2/2003 | Myszka et al. |
| 6,523,683 B1 | 2/2003 | Fraser et al. |
| 6,561,347 B1 | 5/2003 | Lax |
| 6,581,766 B2 | 6/2003 | Hui |
| 6,598,742 B1 | 7/2003 | Belden |
| 6,601,414 B1 | 8/2003 | Chang |
| 6,601,415 B2 | 8/2003 | Takinami |
| 6,619,079 B2 | 9/2003 | Cheung |
| 6,651,811 B2 | 11/2003 | Hai |
| 6,669,018 B2 | 12/2003 | Lau |
| 6,675,961 B2 | 1/2004 | Myszka et al. |
| 6,675,962 B2 | 1/2004 | Myszka et al. |
| 6,675,963 B2 | 1/2004 | Myszka |
| 7,320,235 B2 | 1/2008 | Belden |
| 7,581,419 B2 | 9/2009 | Belden |
| 7,614,265 B2 | 11/2009 | Belden |
| 2001/0000599 A1 | 5/2001 | Belden, Jr. |
| 2001/0035359 A1 | 11/2001 | Sedon et al. |
| 2002/0000111 A1 | 1/2002 | Belden, Jr. et al. |
| 2002/0003095 A1 | 1/2002 | Jaeb et al. |
| 2002/0011426 A1 | 1/2002 | Byrne et al. |
| 2002/0023853 A1 | 2/2002 | Lax et al. |
| 2002/0046963 A1 | 4/2002 | Belden, Jr. et al. |
| 2002/0050033 A1 | 5/2002 | Belden, Jr. et al. |
| 2002/0088851 A1 | 7/2002 | Hodes |
| 2002/0088855 A1 | 7/2002 | Hodes |
| 2002/0091573 A1 | 7/2002 | Hodes |
| 2002/0100702 A1 | 8/2002 | Belden, Jr. et al. |
| 2002/0129472 A1 | 9/2002 | Copen et al. |
| 2002/0139701 A1 | 10/2002 | Luckow |
| 2002/0170837 A1 | 11/2002 | Belden, Jr. et al. |
| 2003/0000856 A1 | 1/2003 | Lax |
| 2003/0000860 A1 | 1/2003 | Byrne |
| 2003/0004889 A1 | 1/2003 | Fiala et al. |
| 2003/0019770 A1 | 1/2003 | Hodes |
| 2003/0029816 A1 | 2/2003 | Huehner |
| 2003/0034259 A1 | 2/2003 | Lopez mas |
| 2003/0052023 A1 | 3/2003 | Gelardi |

| | | | |
|---|---|---|---|
| 2003/0080007 | A1 | 5/2003 | Lau |
| 2003/0111367 | A1 | 6/2003 | Lax et al. |
| 2003/0116455 | A1 | 6/2003 | Marsilio et al. |
| 2003/0193883 | A1 | 10/2003 | Parks |
| 2003/0234190 | A1 | 12/2003 | Kuo |
| 2004/0031708 | A1 | 2/2004 | Spagna |
| 2004/0040349 | A1 | 3/2004 | Guttadauro et al. |
| 2004/0060834 | A1 | 4/2004 | Farrar et al. |
| 2004/0129587 | A1 | 7/2004 | Lax |
| 2006/0238280 | A1 | 10/2006 | Libohova |
| 2006/0254326 | A1 | 11/2006 | Lax |
| 2007/0245779 | A1 | 10/2007 | Lax |
| 2008/0223177 | A1 | 9/2008 | van Koot |

FOREIGN PATENT DOCUMENTS

| | | |
|---|---|---|
| CN | 1143593 | 2/1997 |
| CN | 2298586 | 11/1998 |
| CN | 1215885 | 5/1999 |
| DE | 3316802 | 11/1984 |
| DE | 3923107 | 1/1991 |
| DE | 297 22 209 | 2/1998 |
| EP | 0142748 | 5/1985 |
| EP | 0211088 | 2/1987 |
| EP | 0308810 | 3/1989 |
| EP | 0312172 | 4/1989 |
| EP | 0 545 494 | 6/1993 |
| EP | 0566403 | 10/1993 |
| EP | 0616103 | 9/1994 |
| EP | 0729897 | 9/1996 |
| EP | 1 264 953 | 12/2002 |
| FR | 2543421 | 10/1984 |
| FR | 2608564 | 6/1988 |
| FR | 2628250 | 9/1989 |
| FR | 2628717 | 9/1989 |
| FR | 2711311 | 4/1995 |
| FR | 2715817 | 8/1995 |
| GB | 2036697 | 7/1980 |
| GB | 2079726 | 1/1982 |
| GB | 2129779 | 5/1984 |
| GB | 2351277 | 12/2000 |
| GB | 2369348 | 5/2002 |
| GB | 2371039 | 7/2002 |
| JP | 62-241187 | 10/1987 |
| JP | 07-291336 | 11/1995 |
| JP | 9-132287 | 5/1997 |
| JP | 10-116394 | 5/1998 |
| JP | 10-194371 | 7/1998 |
| JP | 11-035084 | 2/1999 |
| JP | 11-147584 | 6/1999 |
| JP | 11-301766 | 11/1999 |
| JP | 2000-191076 | 7/2000 |
| JP | 2000-191078 | 7/2000 |
| JP | 2000-219288 | 8/2000 |
| JP | 2000-237008 | 9/2000 |
| JP | 2001-002101 | 1/2001 |
| JP | 2001-019077 | 1/2001 |
| JP | 2001-082013 | 3/2001 |
| JP | 2001-163391 | 6/2001 |
| JP | 2001-171776 | 6/2001 |
| JP | 2001-213492 | 8/2001 |
| JP | 2001-253487 | 9/2001 |
| JP | 2001-301871 | 10/2001 |
| JP | 2001-354286 | 12/2001 |
| JP | 2002-046789 | 2/2002 |
| JP | 2002-249190 | 9/2002 |
| JP | 2003-118789 | 4/2003 |
| NL | 1 003 965 C | 3/1998 |
| WO | 90/15001 | 12/1990 |
| WO | 93/15294 | 8/1993 |
| WO | 99/39068 | 8/1999 |
| WO | 00/17877 | 3/2000 |
| WO | 00/17877 A3 | 3/2000 |
| WO | 00/34954 A2 | 6/2000 |
| WO | 00/34954 A3 | 6/2000 |
| WO | WO 01/31152 A1 | 5/2001 |
| WO | 02/42587 | 5/2002 |
| WO | WO 2006/063265 A1 | 6/2006 |

OTHER PUBLICATIONS

EPO Office Action from EP Application No. 05825499.6, dated Apr. 11, 2008.
PCT IPRP from PCT/US2005/042536, dated Jun. 7, 2007.
"Engineers Use I-DEAS to Help Prevent Thefts," Design News, Nov. 6, 1995.
Derwent Information Ltd. Abstract of German Patent No. DE 29620435, Feb. 6, 1997.
Derwent Information Ltd. Abstract of U.S. Patent Application No. 5,996,788, Dec. 7, 1999.
"Security Products for Entertainment Media," Clear-Vu Products, Westbury, New York, Mar. 2000.
Derwent Information Ltd. Abstract of U.S. Patent Application No. 6,065,594, May 23, 2000.
Derwent Information Ltd. Abstract of U.S. Patent Application No. 6,135,280, Oct. 24, 2000.
"Security Products for Entertainment Media," Clear-Vu Products, Westbury, New York, Mar. 2001.
Derwent Information Ltd. Abstract of U.S. Patent Application No. 6,222,453, Apr. 24, 2001.
Derwent Information Ltd. Abstract of U.S. Patent Application No. 2001/0000599, May 3, 2001.
"Zenith Pac Technology: The Intelligent Standard," presented in Melbourne, Australia by Clear-Vu Products, Westbury, New York, Nov. 13, 2001.
Derwent Information Ltd. Abstract of PCT Publication No. WO 200207152, Jan. 24, 2002.
Derwent Information Ltd. Abstract of PCT Publication No. WO 200207165, Jan. 24, 2002.
Derwent Information Ltd. Abstract of U.S. Patent Application No. 6,354,435, Mar. 12, 2002.
Clear-Vu Products, Press Release, Zenith Pac Brochure, Mar. 29, 2002.
"Zenith Pac," presented at ERSC Conference in New York by Clear-Vu Products, Westbury, New York, Apr. 4, 2002.
Derwent Information Ltd. Abstract of PCT Publication No. WO 200229816, Apr. 11, 2002.
Clear-Vu Products, Press Release, Zenith Software Pac; Jun. 28, 2002.
Derwent Information Ltd. Abstract of U.S. Patent Application No. 2002/0096442, Jul. 25, 2002.
Derwent Information Ltd. Abstract of PCT Publication No. WO 200266342, Aug. 29, 2002.
Clear-Vu Products, Press Release, Zenith Flex Pac Brochure, Oct. 8, 2002.
Red Tag™ Brochure—AGI Media Packaging, Introducing the Red Tag™ Security System—World Class Retail Security for DVD and CD-ROM, Oct. 9, 2002.
Derwent Information Ltd. Abstract of German Patent No. DE 20211245, Nov. 7, 2002.
Derwent Information Ltd. Abstract of U.S. Patent No. 6,540,074, Apr. 1, 2003.
Clear-Vu Products, Press Release, VIVA/Clear-Vu Reach Milestone in Media Packaging, Apr. 7, 2003.
Clear-Vu Products, Press Release, ZII Locking System Sell Sheet, Apr. 24, 2003.
Clear-Vu Products, Press Release, One Time Internal Locking System, Apr. 29, 2003.
Derwent Information Ltd. Abstract of PCT Publication No. WO 200347997, Jun. 12, 2003.
Clear-Vu Products, Press Release, Merging Physical and Electronic Security into Retail Packaging. Jun. 12, 2003.
Derwent Information Ltd. Abstract of PCT Publication No. WO 200349083, Jun. 12, 2003.
Derwent Information Ltd. Abstract of U.S. Patent Application No. 2003/0111365, Jun. 19, 2003.
Clear-Vu Products, Press Release, Making a Retail for Pilfer-proof Packaging, Jun. 24, 2003.
Peregrine Marketing, LLC presentation, PM @ POS, Piracy Management at Point of Sale, Jul. 10, 2003.
Peregrine Marketing, LLC presentation, PM @ POS, Piracy Management at Point of Sale, Jul. 10, 2003.

Clear-Vu Products for Entertainment Media, Press Release, 2003 Product Catalog, Jul. 15, 2003.

Clear-Vu Products, EAS Tag Press Release, OTC Safe Sell Packaging Solutions, Jul. 15, 2003.

Clear-Vu Products, Press Release, ClearVu Quick Path, Jul. 17, 2003.

Clear-Vu Products, Press Release, The Zenith OneTime Internal Security Locking System, Aug. 2003.

Public Relations@nexpak.com, Nexpak's New Lockable Rental Case Provides greater security for Live DVD's and Games; Sep. 22, 2003.

http://www.nexpak.com, Nexpak's New Lockable Rental Case Provides greater security for Live DVD's and Games (visited and printed on Oct. 22, 2003).

http://www.tagcompany.com/redtag/sitemap.htm, The Red Tag-Advanced DVD & Games Security System (visited and printed on Oct. 22, 2003).

MacNalara, Daniel and Pasztor, Andy: Thinking Inside the Box: Shipping Containers Get 'Smart', Wall Street Journal; Jan. 15, 2004.

http://www.tradeguys.com, Trade Guys International Disc Storage & Security Solutions (visited and printed on Dec. 2, 2004).

SYSTEM AND METHOD FOR VERIFYING A SECURITY STATUS OF A LOCKABLE CONTAINER

CROSS-REFERENCE TO RELATED APPLICATIONS

This application is a continuation-in-part of U.S. patent application Ser. No. 10/776,583, filed Feb. 10, 2004, which claims the benefit of U.S. Provisional Application Nos. 60/446,386, filed Feb. 10, 2003 and 60/487,467, filed Jul. 14, 2003. This application also claims the benefit of U.S. Provisional Application Nos. 60/630,452, filed Nov. 23, 2004, 60/644,197, filed Jan. 13, 2005, and 60/730,585, filed Oct. 26, 2005. The aforementioned earlier filed applications are all hereby incorporated by reference herein in their entireties.

BACKGROUND OF THE INVENTION

The present invention relates generally to the field of retail and consumer merchandising, and more particularly to apparatus and methods for automated processing of retail and consumer merchandise in lockable containers.

The process of retail checkout is often a source of frustration for the consumer. Typically, retail checkout involves long wait times and interaction with inefficient or inexperienced retail clerks. In some instances, consumers must wait for several minutes to process a single item at checkout.

In addition, conventional checkout techniques are typically not integrated with inventory control or product activation. For example, security and audit tags, such as electronic article surveillance ("EAS") tags, typically are manually removed or deactivated at checkout by the retail clerk using a separate process. This results in audit and security tags being unintentionally left behind on purchased merchandise. A security tag that is left on merchandise not only frustrates the consumer, who has to return to a retail clerk to have the tag removed or deactivated, but also decreases productivity and checkout efficiency.

There is a general trend toward self-checkout in retail stores, libraries, and rental locations, allowing consumers to buy or rent a product with nominal wait times. Self-checkout allows consumers to expedite their checkout process and partially or completely remove the interaction with the retail clerk. Some of the these self-checkout systems integrate payment with the self-checkout process, as with conventional grocery self-checkout terminals.

Such systems may also process merchandise protected with a benefit denial device. These systems provide a consumer with a physical asset at a point of sale (which, as used herein, will also include a "point of rental" or any other distribution or return point). The consumer then uses security information to obtain a benefit from the asset. A benefit denial device may deny a benefit to an unauthorized asset user and provide the benefit or permit access to the benefit to an authorized asset user.

The security information may be provided to the consumer at the point of sale. The security information may be stored with the asset in a form that is unusable by or inaccessible to the consumer until the consumer pays for the asset. The consumer is thus denied a benefit of the asset until the consumer has purchased or rented the asset. An entity that holds a right, such as an ownership right, in the asset is called a rights holder or content provider. The rights holder or content provider conveys a right to the consumer and is thus provided with protection against piracy and unauthorized reproduction of the benefit. This is because, in some instances, a pirate would be required to obtain the security information before acquiring the benefit. Furthermore, if a pirate were to sell unauthorized copies of the asset and provide buyers with security information, the rights holder or content provider could deny the benefit to buyers who use duplicated security information or security information corresponding to a stolen asset. This is often the case with software products that require product activation over the Internet or telephone with a unique product key.

An asset may include, for example, consumer electronics, cosmetics, an audio cassette, a CD, a CD-ROM, a video cassette, a DVD or a mini DVD, or any other asset capable of being stored in a storage case or container. The storage case may be displayed in an environment in which potential customers, renters, or users pick up and examine the storage case to determine whether they are interested in buying, renting, or otherwise acquiring the asset.

Known benefit denial systems for assets require security information to be stored on a card. The card must be "swiped" at the point of sale. Swiping a card is time-consuming and decreases the efficiency of point-of-sale processes such as check-out. The card is also exposed to viewing and tampering. Tampering may defeat the effectiveness of a benefit denial system.

In addition, the return of an asset in a container, particularly a rental asset in a container, poses several problems for the retailer. The retailer must manually process and restock the returned asset. Typically, this involves reactivating an EAS or other similar security device, locking the asset container, resetting the benefit denial device, and restocking the container on the sales or rental floor. This process can be time-consuming and tedious for the retailer.

In view of the foregoing, it would be desirable to provide improved apparatus and methods for processing and returning items at a point of sale quickly and efficiently.

It would be further desirable to provide apparatus and methods for preventing tampering with a device that retains security information.

It would be further desirable to provide apparatus and methods for verifying the security status of a container before the container leaves the retail or rental location.

It would be still further desirable to provide apparatus and methods for reducing risk of economic loss to an entity selling or renting an asset.

SUMMARY OF THE INVENTION

In accordance with principles of the invention, systems and methods for processing an asset in an asset container are provided. The asset container may be received by a decoupler assembly, which may move the asset through a processing path based on information received from at least one of the asset container and the asset within the container.

In some embodiments, the decoupler may lock and/or unlock the asset container while moving the asset through the processing path. The decoupler may separately process the asset for sale, rental, loan, or return. To lock and/or unlock the container, the decoupler may pass the asset container through one or more magnetic fields. After locking or unlocking the container, the security status of the container may be verified by detecting reflected electromagnetic radiation from a portion of the container. In some embodiments, the decoupler may optically scan the container to verify that the container was successfully processed.

In some embodiments of the invention, an apparatus for use with a benefit denial system is provided. The apparatus may include a containing element configured to receive an asset.

The asset may include a benefit for a user of the asset. The apparatus may include an electrical or RFID circuit that includes an antenna and is operatively associated with the containing element and configured to communicate information corresponding to the asset to a receiver outside the containing element. The information may be configured to be used by the benefit denial system to provide the benefit to the user.

In some embodiments of the invention, a container for use with a system for executing a conveyance of an interest in an asset from a first party to a second party is provided. The container may include a containing element configured to receive the asset and an electrical or RFID circuit operatively associated with the containing element and configured to communicate information corresponding to the asset to a receiver outside the containing element. The information may be configured to be used by the system to execute the conveyance.

In some embodiments of the invention, a container for an asset is provided. The container may include a containing element configured to receive the asset and an electrical or RFID circuit attached to the containing element and/or the assert and configured to communicate information corresponding to the asset to a receiver outside the containing element. The invention may include a circuit deactivator configured to interrupt electrical communication within the circuit.

In some embodiments of the invention, a locking member for use with 1) a benefit denial system; and 2) a lockable container, including an integral, internal locking member, is provided. The locking member may include an electrical circuit configured to communicate information associated with the asset to a receiver outside the container. The locking member or the container may include a security status indicator configured to close an optical circuit between the indicator and an optical sensor used to verify the security status of the container.

In some embodiments of the invention, a method for providing a benefit of an asset to an asset user may be provided. The method may include receiving asset identification information transmitted by an antenna enclosed in a containing element and providing access information corresponding to the asset identification information to the user. The access information may be configured to provide the user with access to the benefit.

In some embodiments of the invention, a method for processing a container may be provided. The container is engaged with a container transport assembly. Status information is received from the container and/or the asset within the container. After receiving the information, the container may transported along a processing path in a sequence based on the received information. The processing path may alter the security information associated with the container.

In some embodiments of the invention an apparatus may be provided for processing an item in a lockable container. The apparatus may engage the lockable container with a container transport assembly and receive status information from the container and/or the asset within the container via a receiver. The apparatus may then transport the container along a processing path in a sequence based on the received status information. In some embodiments, the processing path may alter the status information associated with the container and/or the asset within the container. The processing path may expose at least a portion of the lockable container to a magnetic field. In some embodiments, this field may be used to lock or unlock the lockable container. In other embodiments, the field may also activate or deactivate a security tag associated with the container.

In some embodiments of the invention a lockable container for securing an asset may be provided. The container includes a first cover and a second cover. The first and second covers are configured to move between an open position which allows access to the asset, and a closed position which prevents access to the asset. The container also includes a locking member that is configured to move between an unlocked position in which the first and second covers can move to the open position and a locked position which locks the first and second covers in the closed position. The locking member may include a security status indicator that is indicative of the security status of the container. The security status indicator may exhibit two positions. In one position the indicator is configured to close an optical circuit between an optical sensor and the indicator and in another position the indicator is configured to open the optical circuit with the optical sensor.

In some embodiments of the invention a method for verifying the security status of a lockable container containing a security status indicator may be provided. The security status indicator may be aligned with an electromagnetic radiation source. The indicator may then be exposed to the electromagnetic radiation source and reflected electromagnetic radiation may be detected. The security status of the container may then determined from the detected reflected electromagnetic radiation.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1A:
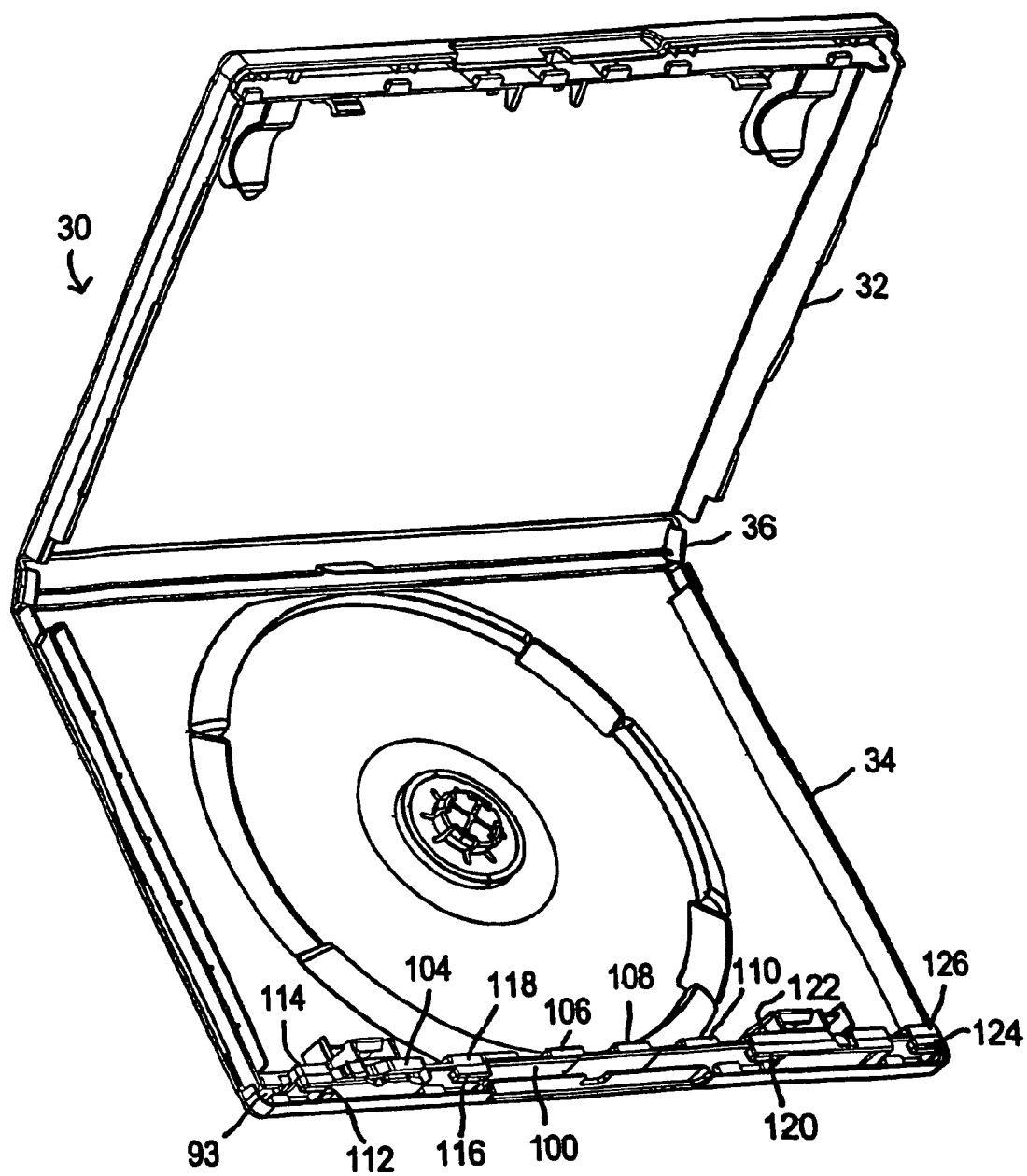
FIG. 1A shows an illustrative lockable container in accordance with one embodiment of the invention.

In some embodiments, the invention may provide an apparatus for use with a benefit denial system. The apparatus may include a containing element, such as a lockable container, that is configured to receive an asset. The asset may include a benefit for a user of the asset, such as electronic data encoded within or on the asset. For example, the asset may include encoded data, music, video, games, etc. In some embodiments, the assert may take the form of a CD, DVD, video or audio cassette, or any other asset capable of being contained within a containing element.

The containing element may include an electrical circuit for communicating information via an antenna to a receiver outside the containing element when the containing element is closed. The circuit may be disposed within or on the containing element, on the asset, or both. The circuit may communicate information to the receiver when the containing element is closed. The circuit may also communicate information to the receiver when the asset is enclosed inside the containing element or when the asset is locked inside the containing element. In some embodiments, the electrical circuit is also capable of receiving information from the receiver. In these embodiments, the receiver acts as both a receiver and a transmitter, and the electrical circuit may include receiver and transmitter circuitry.

In some embodiments, the electrical circuit communicates via RF signals. The circuit may include an RFID tag, RF transponder, RF transceiver, electronic product code (EPC) tag, reader, or any other component of an automated data collection (ADC) system that enables wireless capture and transmission of data using radio waves. The electrical circuit may include one or more active or passive RFID tags. For example, if the circuit includes an active tag, the antenna associated with the tag may continuously emit data in the form of radio signals. Typically, the active tag may require a power source, such as a battery. If the circuit includes a passive tag, the tag may be interrogated by the receiver (or reader), which may also supply power to the electrical circuit.

The information read from or written to the electrical circuit may be configured to be used by the system to provide the benefit to the user. The information may be required by the system to provide the benefit to the user.

The apparatus may include a locking element configured to lock the containing element in a closed state. In some embodiments, the electrical circuit may be affixed to the locking element. In other embodiments, the electrical circuit may be affixed to the containing element, the asset, or both the containing element and the asset.

Examples of an asset containing element and apparatus for locking the containing element are shown and described in U.S. Patent Application Publication Nos. 2002/0023853, 2003/0000856, 2003/0111367, and 2004/0129587, all of which are hereby incorporated by reference herein in their entireties.

The examples include locking members that are operated by inserting the locking member into, and removing the locking member from, the containing element. The examples also include locking members that are internal to the containing element and are operated by moving the locking member from one position inside the containing member to another.

The circuit may include a data storage device. This device may be an integrated circuit chip and may be largely programmable. The digital storage device may be any suitable device and may include, for example without limitation, one or more of erasable programmable read-only memory, programmable read-only memory, read-only memory (ROM), electrically erasable read-only memory, random access memory (RAM), and hybrid types of memory. The circuit device itself may include an integrated circuit chip. The digital storage device may include asset identification information associated with the asset in the containing element, price information, security information, or any other related information.

In some embodiments of the invention, one circuit may be included in an EAS tag. The EAS tag may be configured to trigger an alarm if an article to which the tag is attached is moved into proximity with a detector that senses the presence of the tag.

In embodiments in which the electrical circuit is affixed to the locking element, the data storage device may be a reprogrammable, reburnable, or rewritable device. Reprogrammable or reburnable devices may be reprogrammed or reburned, respectively, to reconfigure the electrical circuit to communicate information associated with a different asset. For example, a first asset may be removed from the containing element and a second asset may be placed in the containing element. If so, the electrical circuit may be reconfigured to communicate information associated with the second asset.

The circuit may include an antenna, which may be any suitable antenna, including without limitation any suitable dielectric resonator of any suitable geometry. The circuit may include or be part of a contactless smart card such as that sold under the name GemEasy 8000 by Gemplus Corp. of Horsham, Pa. The circuit may include or be part of a contactless smart object such as that sold under the name MA8000 by Gemplus of Horsham, Pa.

The asset and/or the containing element may have a type. For example without limitation, the asset may be a compact disc, a digital video disc, a digital versatile disc, a memory card, a memory cartridge, a memory chip, or any other suitable data storage or recording medium. In some embodiments, the asset may be a consumer product. The apparatus may be configured to enclose no more than three assets of a type. The apparatus may be configured to enclose no more than two assets of a type. The apparatus may be configured to enclose no more than one asset of a type.

The asset and/or containing element may also be associated with a processing status. In some embodiments, the processing status may indicate whether the asset is available for processing (e.g., able to be purchased, rented, loaned, or returned). The processing status may also include asset identification information, such as the asset title, description, price, or any other suitable information. If the asset is a rental asset, the processing status may also include information relating to the last or current renter, rental return dates, location where the asset was rented, location where the asset is to be returned, or any other suitable information.

The benefit associated with asset may include any suitable product or service. For example, the benefit may include electronic or digital data, an executable computer program, an electronic game, audio, video, graphics, or any other benefit. In some embodiments, the benefit may include data that is inactive before the system receives a portion of the information. Inactive data may be unusable until it is activated. The system may be configured to activate the data.

The data may be configured to be accessed using an access device. The access device may be, for example without limitation, a personal computer, a work station, a mobile telephone, a personal data assistant, a game system (for example, without limitation, systems such as those sold under the trademarks GAMECUBE and GAMEBOY, by Nintendo of America, Inc. of Richmond, Wash.; PLAYSTATION, by Sony Corporation of America, Inc. of New York City, N.Y. and XBOX, by Microsoft Corporation of Redmond, Wash.) and any other suitable access device. In some embodiments, the access device may require at least a portion of the information to provide the benefit to the user.

In some embodiments of the invention, the apparatus may be configured to provide a data key to the device. In some embodiments of the invention, the user may request the data key from the apparatus via telephonic communication. The telephonic communication may include voice communication. The telephonic communication may include telephone keypad tones. In response to the request, the apparatus may provide the data key to the user. The user may communicate the data key to the access device.

The data key may be configured to activate the data and may include activation data. In some embodiments, the data key may be a file that is required before the user may obtain the benefit from the asset. The file may be an executable, non-executable, read-only, or read-write file. The file may also be encrypted. If the filed in encrypted, the file may include decryption information and/or one or more license numbers for one or more user licenses. Each license may entitle the user to obtain the benefit. In some embodiments, each license may entitle the user to obtain only a portion of the benefit. Multiple licenses may be aggregated to obtain a larger portion of the benefit. For example, one license may allow read-only access to the benefit, while another license may allow read-write access to the benefit. Multiple licenses may be combined to obtain the complete benefit. Alternatively or additionally, a license may require that the user obtain the benefit using a single access device. The access device may be identified to the system by the user, or the access device may identify itself to the benefit denial system.

In some embodiments, the apparatus may be configured to receive user information in the form of user input. The user information may include security data configured to be communicated by the user to the system. The security data may include an access code or a personal identification number (hereinafter, "PIN"). The information may include encoded letters, numbers, or any other suitable symbols. The system may also receive other user input, such as purchase or account information.

The information received or transmitted by the system may include transaction data configured to be communicated by the receiver to the apparatus. The transaction data may be communicated to the system to confirm that the asset was conveyed to the user via an authentic transaction. As used herein, an authentic transaction may be a transaction that is authorized by an entity that owns or possesses or is conveying a copyright, patent right, trademark right, trade secret, or other right or intellectual property right in the asset. The transaction data may include data related to the sale or rental of the asset, including price and availability information.

The containing element may include optically opaque material. The optically opaque material may make it impossible for a viewer to perceive the presence or location of the circuit inside the containing element. In some embodiments, the containing element may be entirely opaque.

In some embodiments, the invention may provide a container for use with a system for executing a conveyance of an interest in an asset from a first party to a second party. The container may include a containing element configured to receive and enclose the asset. The container may also include an electrical circuit configured to communicate information corresponding to the asset to a receiver located outside the containing element when the containing element is closed. The circuit may disposed within the containing element, on the asset, or both. The information may be configured to be used by the system to execute the conveyance.

The circuit may be configured to communicate the information when the asset is enclosed within the containing element. The circuit may also be configured to communicate the information when the asset is locked in the containing element. The information may include status information indicating the presence or absence of the asset in the containing element. For example, electrical circuits on both the container and the asset may both be configured to transmit information to the receiver. The receiver may then determine, from the received information, if the containing elements includes the asset.

The information may be required by the system to execute the conveyance, which may be a consignment sale. The interest may include an ownership interest in the asset. The interest may include a right to use the asset. The circuit may be configured to communicate the information before a third party places the asset in the possession of the second party. The third party may be a vendor, for example without limitation, a retailer, a wholesaler, a rental agent, or any other suitable entity. The third party may be an entity that does not hold an ownership interest in the asset during the conveyance.

In some embodiments, the invention may provide an asset container that may include a containing element configured to receive and enclose the asset. The containing element and/or the asset may include an electrical circuit configured to communicate information corresponding to the asset to a receiver outside the containing element when the containing element is closed. A circuit deactivator may be configured to interrupt electrical communication within the circuit.

The deactivator may be configured to interrupt electrical communication between a first portion of the circuit and a second portion of the circuit. The first portion may include a digital data storage device. The second portion may include an antenna. The deactivator may be configured to interrupt the electrical communication by physically separating the first and second portions of the circuit. The deactivator may be configured to be operated manually by a user of the asset.

The information may be configured to be used by a benefit denial system to provide to a user access to a benefit. The information may be required by the benefit denial system to provide the access. The information may be configured to be used by an asset transaction system to convey an interest in the asset from an interest conveyor to an interest receiver. The information may be required by the asset transaction system.

In some embodiments, the invention may provide a method for providing a benefit of an asset to an asset user. The method may include receiving asset identification information transmitted by an antenna enclosed in a containing element and providing access information corresponding to the asset identification information to the user. The access information may be configured to provide the user with access to the benefit.

The method may include providing the access information to the user via a point-of-sale entity. The method may include notifying a content provider regarding that the user has initiated a purchase of the asset. The content provider may be an entity that owns or possesses or is conveying a copyright, patent right, trademark right, trade secret, or other right or intellectual property right in the asset.

The method may include providing a label to the user. The label may bear at least a portion of the access information (such as a PIN). The label may be configured to adhere to the container. The portion may be human-readable or machine readable and may include a barcode, hologram, watermark, or other indicia.

The asset identification information may include an electronic product code. The asset identification information may include a universal product code.

The method may include activating the benefit. The activating may include identifying the access information as active access information. The access information may be stored in a storage device and electronically identified as "active."

The method may include receiving the access information from the user. The method may include providing to the user a key to the benefit if the access information received from the user corresponds to access information identified in the storage device as activated access information. The key may serve to activate the asset. The key may serve to activate the benefit.

It will be appreciated that, according to the principles of the invention, the terms "active", "activating" and "activated", as applied to access information, refer to the process by which a system (such as a benefit denial system) designates that a benefit corresponding to the access information will be conferred to a user if the user presents the access information (or a facsimile thereof) to the system. The system may then activate the benefit by providing information required to provide the benefit to the user. If the user presents access information (or a facsimile thereof) that does not correspond to activated access information, system will not activate the benefit and the user will be denied the benefit.

A number of features of illustrative embodiments of the invention are shown in FIGS. 1-15.

FIG. 1A shows an illustrative lockable container in accordance with one embodiment of the invention. Container 30 includes a first cover 32, a second cover 34, and a spine 36 disposed therebetween. First cover 32 and second cover 34 are pivotally coupled to spine 36 to form a living hinge.

Container 30 may include a locking mechanism. The locking mechanism of the invention may be integral with the container, and therefore may remain with the container, regardless of whether the container is locked or unlocked. Thus, the container may be both locked and unlocked without removing any portion of the locking mechanism (e.g., a locking member) from the container. Accordingly, there is no need to reuse, restock, recycle or discard any portion of the locking mechanism.

Container 30 may be locked to secure an asset within the container. In particular, container 30 may include internal locking member 100 and a locking mate arrangement situated within container 30. Locking member 100 and locking mate arrangement are configured for engagement such that first cover 32 is secured to second cover 34, thereby securing an asset within container 30.

FIG. 1A shows container 30 with locking member 100 inserted therein in the unlocked position. Locking member 100 may be inserted into container 30 after the container has been manufactured. For example, locking member 100 may be snapped into place within container 30 at the location in which the container is manufactured. As shown in FIG. 1A, in some embodiments of the present invention, at least one end of locking member 100 may be extended to the edge of container 30 to provide more security. This may prevent, for example, a thief from prying at the corners of container 30 to attempt to open the container.

In some embodiments, locking member 100 may include at least one spring-arm arranged on an end of the locking member that is configured to magnetically couple with an external manual magnetic key arrangement. The spring arm causes locking member 100 to alternately move into the locked and unlocked positions. In the embodiment shown in FIGS. 1B and 1C, and as more fully explained below, locking member 100 may include spring arms 102 and 104 arranged on opposite ends of the locking member.

In some embodiments of the present invention in which spring arms 102 and 104 are integrally formed (e.g., molded) with locking member 100, the spring arms may need to be rotated out of alignment with the longitudinal axis of locking member 100 so that magnetic inserts 174 and 172 are properly positioned within the spring arms. The process of rotating each of spring arms 102 and 104 out of alignment with locking member 100, however, may cause an unwanted bias on the spring arms, thereby causing locking heads 170 and 168 to be displaced outward in a direction perpendicular to the longitudinal axis of locking member 100. Accordingly, each spring arm 102 and 104 may be provided with hooks 184 and 180, and hook catches 186 and 182, respectively. In this manner, spring arms 102 and 104 may be properly positioned after inserting magnetic inserts 174 and 172, respectively, so that the spring arms do not protrude perpendicularly to the longitudinal axis of locking member 100.

Figures 1B, 1C:
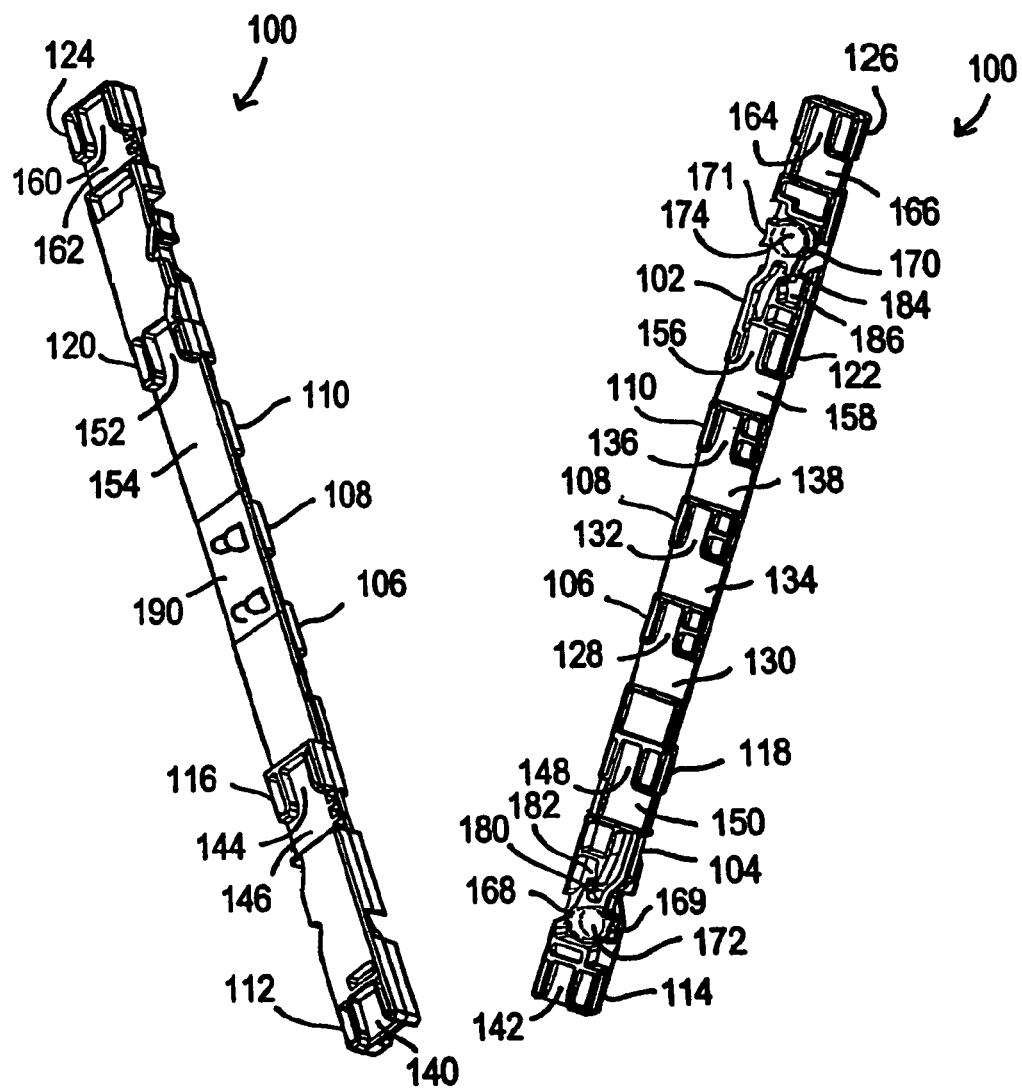
FIGS. 1B and 1C are perspective views of an illustrative locking member for use with the lockable container of FIG. 1A in accordance with one embodiment of the invention.

As shown in FIGS. 1B and 1C, locking member 100 includes multiple I-beam engagement portions for engaging associated tabs or protrusions within container 30. Locking member 100 includes three engagement portions 106, 108, and 110 that will be referred to herein as "single engagement portions." "Single engagement portion" shall refer to an engagement portion that has no corresponding engagement portion on the opposite side of locking member 100. Locking member 100 includes eight engagement portions 112 and 114, 116 and 118, 120 and 122, and 124 and 126 that will be referred to herein as "double engagement portions." "Double engagement portion" shall refer to an engagement portion that has a corresponding engagement portion on the opposite side of locking member 100. (It should be noted that although locking member 100 is described herein as having three single engagement portions and eight double engagement portions, this arrangement is merely illustrative, and locking member 100 may have any suitable arrangement and number of engagement portions.)

The double engagement portions of locking member 100 (i.e., portions 112-126) are configured to engage associated tabs of first cover 32 and second cover 34 of container 30. Each engagement portion (i.e., engagement portions 106-126) includes a locking trench and a release trench. The various locking trenches are designed so that when container 30 is closed and the tab portions on first cover 32 are aligned with the corresponding tab portions on second cover 34, locking member 100 slides into the locked position so that each locking trench catches and traps the corresponding tab portions therebetween, preventing the corresponding tab portions from being separated. This alignment prevents container 30 from being opened.

In particular, engagement portions 106, 108, and 110 each have locking and release trenches 128 and 130, 132 and 134, and 136 and 138, respectively. Engagement portions 112 and 114 include locking trenches 140 and 142, respectively. With regard to release trenches for engagement portions 112 and 114, the engagement portions share a "release trench" 93 in container 30. In actuality, release trench 93 is a space within container 30. Engagement portions 116 and 118 each include locking and release trenches 144 and 146, and 148 and 150, respectively. Engagement portions 120 and 122 each include locking and release trenches 152 and 154, and 156 and 158, respectively. Engagement portions 124 and 126 each include locking and release trenches 160 and 162, and 164 and 166, respectively.

To lock container 30, locking member 100 is made to slide in a direction that engages the corresponding tabs with the appropriate locking trenches. This traps the corresponding tabs within the locking trenches and prevents the tabs from separating and, consequently, the container from opening. In other words, the container may not be opened, since the associated tabs of first cover 32 are prevented from freely traversing the various release trenches when the first cover is pulled away from second cover 34.

Locking member 100 may include status indicator 190 on the face of locking member 100 which may include locking and unlocking status information. The status information may be placed thereon by known method. When the locking member 100 is slid between the locked and unlocked positions, the appropriate status information corresponding to the position of the locking member, for example, may appear through a status window of container 30 for a user to read.

Figure 2A:
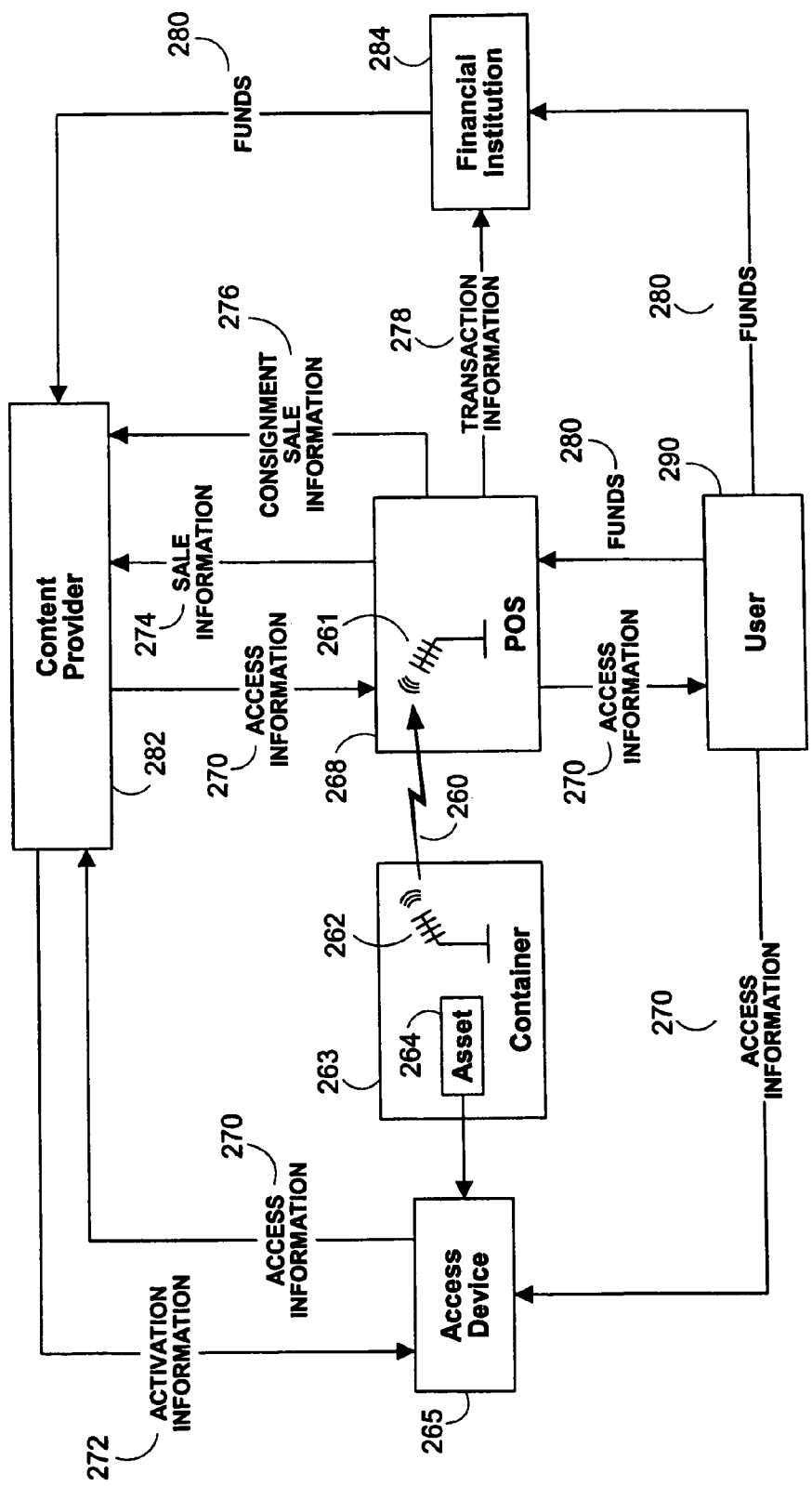
FIG. 2A is an illustrative schematic diagram of apparatus, systems, and information in accordance with one embodiment of the invention.

FIG. 2A shows illustrative information 260 that may be communicated between container 263, which may include antenna 262, and system 268, which may include transceiver 261. System 268 may be associated with a point-of-sale ("POS") system at an asset retail or rental facility. For the purpose of illustration, system 261 will be described as being associated with a retail sales facility. Information 260 may be associated with asset 264. Information 260 may include security information that is required for user 290 to access asset 264 or a portion of asset 264. Information 260 may be required for user 290 to obtain a benefit present on or in asset 264.

In some embodiments, information 260 may be required to initiate a process that provides user 290 with access information 270 that may enable user 290 to access asset 264 or obtain a benefit present on or in asset 264. In some embodiments, information 260 may be required to initiate a process that provides user 290 with activation information 272 that may activate a benefit present on or in asset 264. For the purpose of illustration, the benefit will be described as the use of an electronic game.

User 290 may purchase asset 264 and execute the purchase by interacting with system 268. System 268 may receive information 260 using transceiver 261. Information 260 may be transmitted by antenna 262 on a radio frequency carrier signal. In some embodiments, system 268 may transmit sale information 274, which may be derived from or included in information 260, to content provider 282. It will be understood that the functions described herein as being performed by content provider 282 may be performed by any suitable party using one or more of a system for processing data, a system for communicating data, a system for storing data and any other suitable system. The system or systems may be centralized. The system or systems may be distributed over one or more physical deices. The physical devices may be located in different geographic locations.

System 268 may communicate with content provider 282 via a computer network such as the Internet, a virtual private network or other suitable secure data circuit, or an intranet, via a telephone network, via a wireless communication channel, or via any other suitable communication channel. Sale information 274 may inform content provider 282 that asset 264 has been or is to be sold to user 290 and that the sale occurred through system 268. Content provider 282 may therefore recognize the sale of asset 264 as an authorized or authentic sale. Content provider 282 may provide access information 270 to user 290. In some embodiments, content provider 282 may provide access information 270 to user 290 via system 268. In some embodiments, content provider 282 may provide access information 270 to user 290 via a route (not shown) that is independent of system 268. Access information 270 may be communicated to user 290 via a computer network such as the Internet or an intranet, via a telephone network, via a wireless communication channel, or via any other suitable communication channel.

System 268 may provide access information 270, which may be derived from or be included in information 260, to user 290. User 290 may use access information 270 in conjunction with access device 265 to access or play a computer game stored on asset 264. Access device 265 may be an access device such as any of those described above. It will be assumed for the sake of illustration that the access device is an electronic game system.

In some embodiments, user 290 may "keyboard" access information 270 into access device 265. Access device 265 may communicate access information 270 to content provider 282. Content provider 282 may identify access information 270 as being authorized access information and may provide activation information 272 to user 290, for example via access device 265. Communication between content provider 282 and access device 265 may be via a computer network such as the Internet or an intranet, via a telephone network, via a wireless communication channel, or via any other suitable communication channel.

In some embodiments of the invention, asset 264 may instruct access device 265 to communicate with content provider 282. Asset 264 may include a log-in procedure that prevents access device 265 from launching the computer game until access device receives activation information 272. Access device 265 may display a screen that prompts user 290 to enter some or all of access information 270 into access device 265. After access device 265 receives activation information 272, access device 265 may launch the electronic game. User 290 may then obtain the benefit of playing the electronic game.

In some embodiments, information 260 may include activation information 272 that is provided to user 290 by system 268. In those embodiments, it may not be necessary for system 268 to provide sale information 274 to content provider 282, for content provider 282 to provide access information 270 to user 290, or for access device 265 to communicate with content provider 282. In some of those embodiments, user 290 may keyboard access information into access device 265. Asset 264 may instruct access device 265 to launch the electronic game upon receipt by access device 265 of the activation information.

In some embodiments of the invention, access device 265 may be provided with a transceiver that is configured to communicate directly with antenna 262. In those embodiments, user 290 may place container 263 in communication with access device 265 to transfer any portion of information 260 required for access to asset 264, or a benefit present in or on asset 264, to access device 265.

In some embodiments of the invention, access device 265 may not be in communication with content provider 282. For example, access device 265 may not have an Internet interface. User 290 may communicate with content provider 282 by telephone. User 290 may provide access information 270 to content provider 282 via telephone. Content provider 282 may provide activation information 272 to user 290. User 290 may enter activation information 272 into access device 265 to gain access to the electronic game.

In some embodiments of the invention, information 260 may be used to execute a consignment sale of asset 264. The consignment sale may be a transaction between content provider 282 and user 290. The sale may be facilitated by system 268. The retail sales facility may not own asset 264. The retail sales facility may own asset 264, but may not own the computer game stored on asset 264. Therefore, if asset 264 is lost or stolen, the retail sales facility may lose the value of asset 264 in its inactive state, but may be spared the loss of the electronic game value.

System 268 may provide consignment sale information 276 to content provider 282. Consignment sale information 276 may inform content provider 282 that user 290 has purchased or has agreed to purchase asset 264 and the computer game present on asset 264. Content provider may provide access information to user 290 to enable user 290 to play the electronic game, as described above. User 290 may provide funds 280 to the retail sales facility associated with system 268. User 290 may provide funds 280 to content provider 282 via financial institution 284. System 268 may facility the transfer of funds 280 by providing transaction information 278, which may be credit card information, to financial institution 284. Any of the aforementioned communications in connection with the. consignment sale may be performed via a computer network such as the Internet or an intranet, via a telephone network, via a wireless communication channel, or via any other suitable communication channel.

It will be understood that in some embodiments of the invention, information 260 may include security information that is required for user 290 to access asset 264 or a portion of asset 264. In some embodiments, information 260 may include information that may be used to execute a consignment sale of asset 264. In some embodiments, information 260 may include both security information that is required for user 290 to access asset 264, or a portion of asset 264, and information that may be used to execute a consignment sale of asset 264.

Figure 2B:
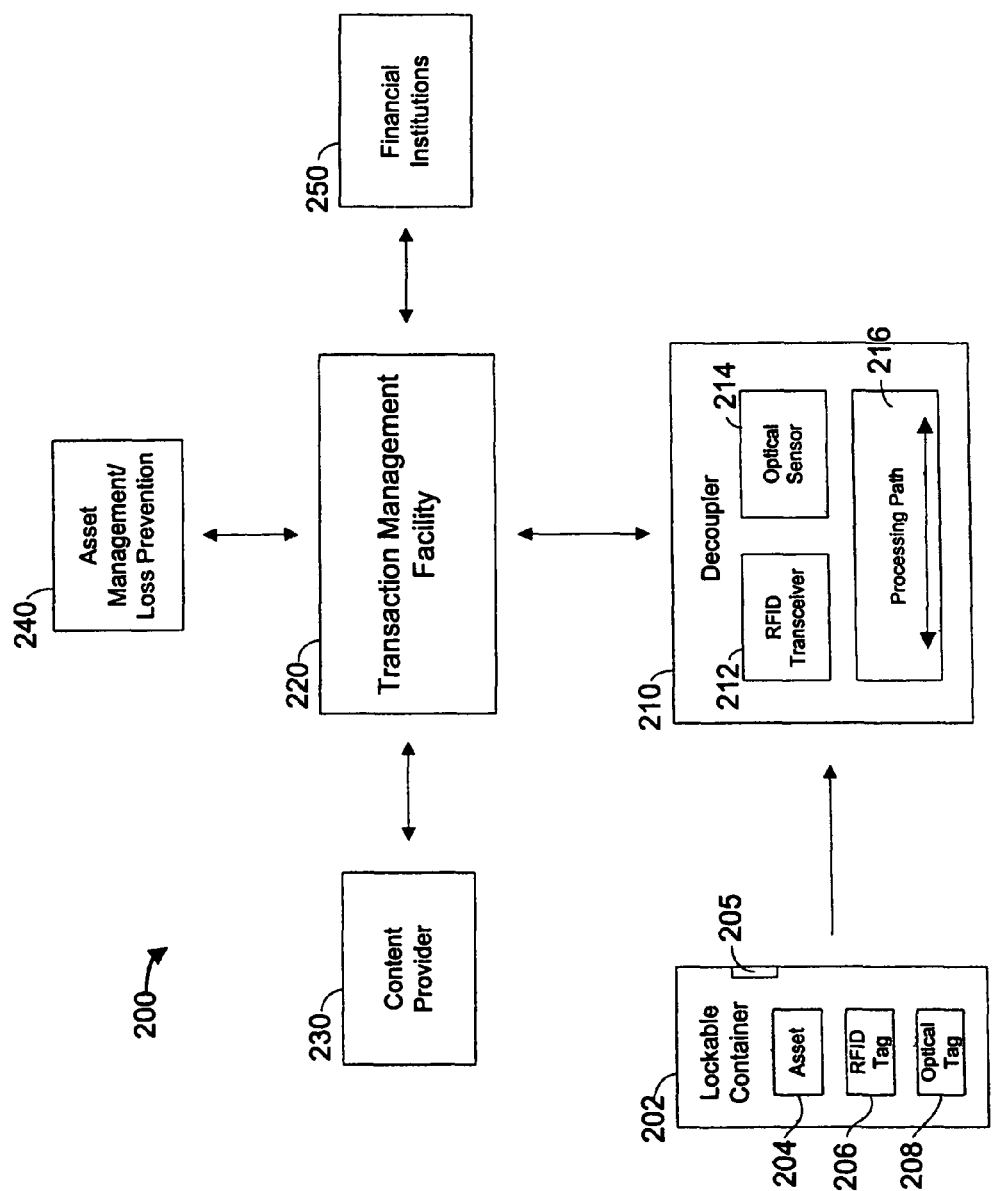
FIG. 2B is another illustrative schematic diagram of apparatus, systems, and information in accordance with another embodiment of the invention.

FIG. 2B is a schematic diagram showing illustrative communication system 200 in accordance with one embodiment of the invention. Lockable container 202 may be any suitable containing element, including the lockable containers described in U.S. Patent Publication No. 2004/0129587, 2002/0023853, 2003/0000856, 2003/0111367, and 2004/0129587. Lockable container 202 may include one or both of RFID tag 206 and optical tag 208. RFID tag 206 and optical tag 208 may be disposed on the exterior surface of container 202, within container 202, and/or on asset 204 held within container 202. Asset 204 may be secured inside lockable container 202. In some embodiments, lockable container 202 contains a disc hub for securing a CD, DVD, or other similar disc.

RFID tag 206 maybe passive or active. In some embodiments, if RFID tag 206 is an active tag, then a battery may power the tag. RFID tag 206 may also be read-only or read-writable. RFID tag 206 may transmit item identification data (or any other suitable information) to decoupler 210 continuously or after being interrogated by a component of decoupler 210. Similarly, decoupler 210 may transmit data to RFID tag 206. Although for the sake of clarity only one instance of RFID tag 206 is shown in FIG. 2, any number of tags may be located on lockable container 202 or on asset 204. In some embodiments, lockable container 202 also contains at least one optical tag 208. Optical tag 208 may include, for example, a barcode, watermark, machine-readable indicia, or any other optical tag conveniently positioned on lockable container 202 or asset 204.

Lockable container 202 may also include at least one reflective tag 205. Reflective tag 205 may be configured to move between a first position and a second position. In the first position, reflective tag 205 may close an optical circuit between the tag and an optical sensor. In the second position, reflective tag 205 may open an optical circuit between the tag and the optical sensor, such as optical sensor 214. The tag may include at least two portions of different reflectivity. In some embodiments, reflective tag 205 comprises reflective foil or tape and indicates whether lockable container 202 is locked or unlocked. In other embodiments, reflective tag 205 includes indicia printed or treated with reflective ink or other reflective material.

Reflective tag 205 may be configured to move or change orientations within lockable container 202 based on the security status of lockable container 202. In at least one embodiment, reflective tag 205 is attached to a locking member of lockable container 202. The locking member may be internal to lockable container 202 and may have a locked position and an unlocked position. The locking member may be moved between the locked and unlocked positions by a magnetic force. As described in more detail in FIGS. 11A and 11B below, reflective tag 205 may be moved along with the locking member, so that tag 205 is indicative of the security status of lockable container 202. One portion of reflective tag 205 having another reflectivity may indicate that lockable container 202 is locked, while another portion of reflective tag 205 having a different reflectivity may indicate that lockable container 202 is unlocked. Reflective tag 205 may be configured to reflect electromagnetic radiation at varying intensities or in different wavelengths (e.g., color of visible light).

Lockable container 202 may be received by decoupler 210. The term "decoupler" or "automatic container processing assembly" is meant to refer to any device or apparatus capable of accepting, engaging, and/or processing asset containers. In some embodiments, these asset containers may be lockable containers as described above. The decoupler or automatic processing assembly may mechanically perform at least one processing task typically performed by a retail clerk. These tasks may include, for example, locking or unlocking the container, scanning an optical tag associated with the container, or any other suitable task. Before or after being received by decoupler 210, RFID tag 206 may transmit to, or receive data from, RFID transceiver 212 of decoupler 210. In some embodiments, lockable container 202 may be inserted into processing path 216. In some embodiments, processing path 216 may engage lockable container 202.

At least a portion of processing path 216 may be exposed to or overlay a magnetic field. The magnetic field may be created by a magnetic field source, such as one or more electromagnets. The magnetic field source may be switched on and off while lockable container 202 is in processing path 216. The magnetic field may selectively lock or unlock lockable container 202 as container 202 is moved through processing path 216. Container 202 may also pass optical sensor 214. Optical sensor 214 may determine the position or orientation of reflective tag 205 by detecting electromagnetic radiation reflected from reflective tag 205. In some embodiments, optical sensor 214 may detect reflected visible light intensity. In some embodiments, optical sensor 214 may detect the color of the reflected visible light. Optical sensor 214 may include a light source, such as a light emitting diode ("LED") or laser. Lockable container 202 may be aligned with the light source via a motorized conveyor or transport assembly, as described in FIG. 3 below. Optical sensor 214 may also include an optical scanner, such as a barcode scanner, for reading optical tag 208 on lockable container 202. Optical tag 208 may be read before, after, or while the container is being processed by decoupler 210.

In addition to receiving lockable container 202, decoupler 210 may, in some embodiments, also eject the container along the same processing path that the container was received. For example, a consumer who wishes to rent a DVD movie may insert the DVD container into decoupler 210. The DVD container may be processed by decoupler 210 moving the container along processing path 216. The container may be ejected from decoupler 210 after processing is complete and returned to the consumer. In some embodiments, the container is not returned to the consumer, but rather moved straight through the decoupler to the back side of decoupler 210. This embodiment may be useful in rental return situations where the asset is being returned to inventory. This embodiment may also reduce theft of assets dropped in an overnight drop box. Decoupler 210 may be connected to another processing device, such as a mechanical conveyor, robotics, or belt system for further processing, or an inventory bin may be positioned at the back side of decoupler 210.

Decoupler 210 may perform one or more of several actions after lockable container 202 is received by decoupler 210. The sequence of actions taken by decoupler 210 may depend on one or more of several criteria, including, but not limited to, the security status of lockable container 202 (e.g., locked or unlocked), the processing status of the asset in the lockable container 202 (e.g., rented and/or purchased), information received from RFID tag 206 (either on the container, on the asset, or both), and information received from optical tag 208.

Decoupler 210 may be multi-functional. Decoupler 210 may scan optical tag 206 while processing the asset. Decoupler 210 may also interpret an information signal emitted from the asset or the container via RFID tag 206. If the signal validates the asset, decoupler 210 may act in response to the signal. To validate the asset, decoupler 210 may communicate with transaction management facility 220. Transaction management facility 220 may include any host, server, data source, or database containing asset or container information. Transaction management facility 220 may also coordinate communication between one or more of decoupler 210 and content provider 230, asset management module 240, financial instructions 250, and any other suitable device or entity.

To validate an asset, asset identity information may be received from lockable container 202 and/or asset 204 via one or more of RFID tag 206, optical tag 208, and reflective tag 205. This received information may be compared against information accessible by transaction management facility 220. Transaction management facility 220 may also communicate with content provider 230, asset management module 240, and/or financial institutions 250 to complete the validation process. For example, transaction management facility 220 may notify asset management module 240 to deactivate a security tag associated with the item so that an alarm will not sound when the item is passed through sensors located at the exit of the store, library, or other location. As another example, transaction management facility 220 may automatically debit the purchase or rental price of the asset from the consumers account by contacting financial institution 250. Transaction management facility 220 may also access information relating to the processing status or availability of the asset in lockable container 202. For example, the item may be sold out or not available for rental. As another example, the processing status may indicate that the asset in the lockable container is for sale only and not for rental. Transaction management facility 220 may access content provider 230 for network access, security information, or media content. In some embodiments, decoupler 210 may write, burn, or record media content or other data from content provider 230 directly to asset 204 or RFID tag 206 while processing the asset.

If the transaction is validated, decoupler 210 may act on lockable container 210 in accordance with a processing sequence based on the received information. The acting may include, among other actions, transporting the asset along processing path 216, locking or unlocking the container, scanning optical tag 208, writing security information or other data to RFID tag 206, verifying the status of the container after processing, and releasing the container.

In some embodiments, decoupler 210 may process lockable container 202 in stages. The first stage of processing may include an interpretation stage, in which information emitted from the asset or the container is received and analyzed. The second stage of processing may include a transport stage, in which the container is moved within decoupler 210 along processing path 216. The third stage of processing may include an acting stage, in which the decoupler acts (e.g., engages the container and/or moves the container along processing path 216) on information received from the container or the asset. The final stage of processing may include an ejection stage, in which the decoupler releases the container or positions the container such that it may be removed from the decoupler by a user or another device.

The decoupler may be configured to receive and release the container to an individual or to another device. In some embodiments, the container is released to the consumer along the same processing path as the container was received. In other embodiments, the container is released along a different processing path than the processing path that container was received.

During the decoupler transport stage, the container may be conveyed to a "read" position. In the "read" position, the decoupler may receive information from, or transmit information to, the asset or the container. The apparatus may include one or more motorized belts. The apparatus may move the container into or through a magnetic field generated by one or more magnets. One or more of the magnets may be permanent magnets or electromagnets. One or more of the magnets may be in a fixed location within decoupler 210. Passing the container into or through the magnetic field may lock and/or unlock the container. In some embodiments, the container may be first locked during the transport stage and then locked or unlocked during the acting stage.

During the decoupler acting stage, the decoupler may take one or more actions in response to the information received from the interpretation stage. The actions may include one or more of reading RFID tag 206, writing to RFID tag 206, killing (deactivating) RFID tag 206, activating an EAS tag, deactivating an EAS tag, unlocking the container, locking the container, or any other suitable action. Table 1 summarizes some of the exemplary actions the decoupler may take based on the security status of the container and the processing status of the asset in the container.

TABLE 1

Exemplary decoupler actions.

| Security Status | Processing Status | Exemplary Decoupler Action(s) |
|---|---|---|
| Secured | For Sale | Receive information; relock container; scan optical tag; activate product; unlock container; and verify unlocked status. |
| Not Secured | | Lock container; receive information; scan optical tag; activate product; unlock container; and verify unlocked status. |
| Secured | For Rent/ For Loan | Receive information; relock container; scan optical tag; activate product; unlock container; and verify unlocked status. |
| Not Secured | | Lock container; receive information; scan optical tag; activate product; unlock container; and verify unlocked status. |
| Secured | For Return | Receive information; relock container; scan optical tag; deactivate product; and verify locked status. |
| Not Secured | | Receive information; lock container; scan optical tag; deactivate product; and verify locked status. |

Table 1 is merely illustrative. The decoupler may be configured to perform any other suitable actions to automate the checkout or return process. In addition, the order of the operations listed above are exemplary. The above actions may be performed, or combined, in any suitable manner. For example, when returning an unsecured asset in a lockable container, the decoupler may first lock the container and then receive status information from the container and/or the asset. In addition, in some embodiments information may be received from both the container and the asset in the container. This information may be used to verify the presence of the asset in the container. For example, if a rental consumer tries to return a lockable DVD container without the correct DVD asset inside the container, the decoupler may reject the container. In other embodiment, the decoupler may process the container, but not alter the processing status information associated with the item.

In order to determine that the container was unlocked properly or in an authorized manner, optical sensor 214 may verify the security status of the container while the container is still in the decoupler. The sensor may read reflected electromagnetic radiation, which may include in some embodiments visible light, from reflective tag 205. Reflective tag 205 may be indicative of the security status of the lockable container. In some embodiments, reflective tag 205 may have a color or be configured to reflect light of a certain color or wavelength. The tag may be positioned on a locking portion (such as a locking bar) of the lockable container so that when the container is locked and unlocked, the orientation of reflective tag 205 may change. In some embodiments, reflective tag 205 includes a colored "unlocked" icon treated with a reflective ink (the color of the ink may be green). In these embodiments, optical sensor 214 may detect both intensity and color of the electromagnetic radiation. In other embodiments, optical sensor 214 may detect only electromagnetic radiation intensity and not color. Reflective tag 205 may be disposed at at least two positions, a reflective position, in which tag 205 closes an optical or opto-electrical circuit between tag 205 and the optical sensor, and a non-reflective position, in which tag 205 opens the optical circuit between the tag and the optical sensor. Optical sensor 214 may optically sense or confirm the position or orientation of reflective tag 205 to confirm the security status of the container.

In some embodiments of the invention, decoupler 210 may be configured to activate the asset in lockable container 202 (as in a checkout activation system). In some of these embodiments, decoupler 210 may enable authorized access to digital media. The decoupler may provide an activating ingredient or excitation to the asset that changes the potency of the substance—for example, a pharmaceutical product—in order to activate a property, which may be a therapeutic property, of the substance. In other embodiments, decoupler 210 includes a transmitter, which may be an RF transmitter, for sending security information to RFID tag 206 or some other storage or memory mechanism associated with the lockable container or the asset within the lockable container.

Decoupler 210 may be configured to automatically process purchases, rentals, returns, and any other consumer transaction. For example, a user may selects an asset displayed "live" on a shelf in a lockable container. The lockable container may show a red "locked" icon indicating that a locking bar in the container is in the locked position. The user may insert the container into decoupler 210 in a specific orientation. In one embodiment, the user inserts the container oriented with the locked icon on right side, hinge on left side. The decoupler may then engage the lockable container with a container transport assembly and move the container along a processing path. The processing path may expose at least a portion of the container to a magnetic field. The magnetic field may be used to lock or unlock a magnetically actuated locking member of the container. The decoupler may also perform any of the processing actions described above while moving the container along the processing path. At the conclusion of the processing stage, the decoupler may alter the processing and/or security status of the container, as appropriate. For example, after a rental CD has been rented, the decoupler may alter the CD's processing status to "unlocked-rented" or some other similar status.

Figure 3:
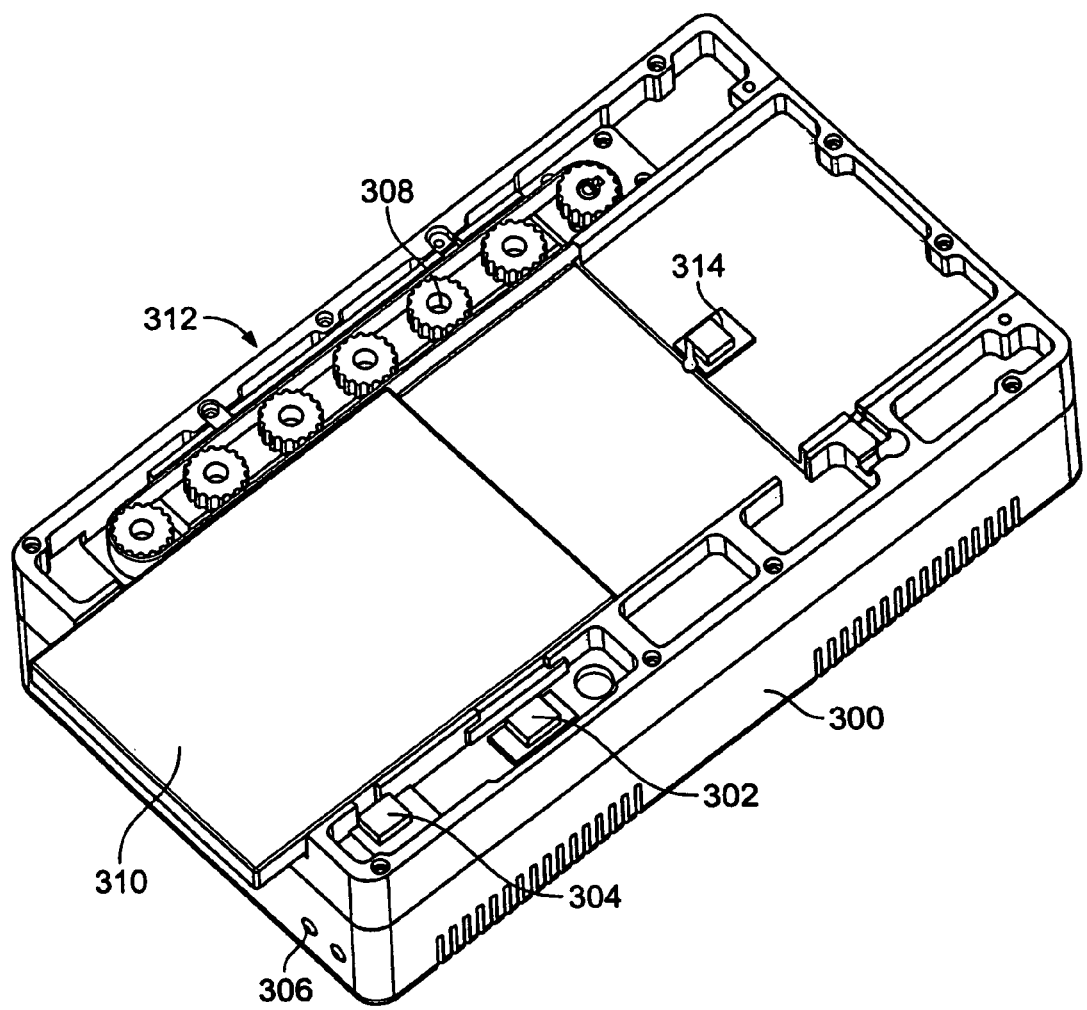
FIG. 3 is a simplified top view of the transport chassis of the decoupler of FIG. 2 in accordance with one embodiment of the invention.

FIG. 3 shows a schematic diagram of a top view of an illustrate transport chassis of the decoupler of FIG. 2. Transport chassis 312 may be secured to main chassis 300. Main chassis 300 is described in more detail below in connection with FIG. 5. Transport chassis 312 may include LED signals 306. LED signals 306 may indicate the processing stage of the decoupler. For example, in one embodiment LED signals 306 include a red and green LED. The green LED may indicate that the decoupler is online and powered. The red LED may indicate that the decoupler is currently processing a container, such as container 310. When processing has finished, the red LED may turn off, signaling to the user that processing is complete. The user may then remove container 310 from transport chassis 312. If the container could not be processed (e.g., an optical tag or RFID tag associated with the container could not be read and/or written to), LED signals 306 may flash indicating an error condition.

Once a container is positioned within the RFID or optical field of the decoupler, the decoupler may read from, write to, or kill one or more RFID tags associated with container 310 and/or an asset within container 310. If the decoupler determines that the information received from the one or more RFID tags constitutes a valid transaction, the decoupler may activate conveyor assembly 308. Alternatively or additionally, when optical sensor 304 scans, detects, or recognizes a valid optical tag on container 310, the decoupler may activate conveyor assembly 308. Optical sensor 304 may include any switch, sensor, or scanner, including a position sensor, that detects or reads machine-readable information from container 310. After container 310 is detected in transport chassis 312, the container may be transported to the back of transport chassis 312. Conveyor assembly 308 may be a powered or unpowered assembly. In one embodiment, a user may manually pushes container 310 into transport chassis 312. The user's force may move conveyor assembly 308, resulting in the mechanical energy needed to power the remainder of the decoupler. In other embodiments, the decoupler may be powered via an external power source. The external power source may be used to create an electromagnetic drive system with reversible polarity. The electromagnetic drive system may be used to effect movement of metal reaction portions of the lockable container causing the container to lock or unlock. Optical sensor 304 may cause an electrical signal to be transmitted to a motor attached to conveyor assembly 308. This electrical signal may cause conveyor assembly 308 to transport container 310 further into transport chassis 312.

In some embodiments, transport chassis 312 may accept variable-sized containers. For example, conveyor assembly 308 may be supported by springs (not shown), which dynamically adjust to fit the size of the container to be processed. Conveyor assembly 308 may also include any number of sprockets, wheels, and/or conveyor belts. In the depicted embodiment, one endless belt is shown; however, any number of belts and any number of conveyor assemblies may be used in other embodiments.

Optical sensor 304 may also scan container 310 as it moves into transport chassis 312. For example, optical sensor 304 may scan a portion of the container containing a barcode, watermark, hologram, or any other machine-readable indicia. In some embodiments, conveyor assembly 308 may stop the transport of container 310 so that optical sensor 304 may scan a tag associated with container 310. In other embodiments, the container is scanned while being transported to the back of transport chassis 312.

At some point, container 310 may make contact with rear contact switch 314, which may be located at the back of the processing path of the decoupler. Rear contact switch 314 may include any switch or sensor, including a position sensor. Once contact switch 314 is actuated, conveyor assembly 308 may reverse the container's direction of motion. Although in the example of FIG. 3 container 310 may be transported back along the same physical processing path from which it entered, in other embodiments container 310 may be transported along a different physical processing path. For example, container 310 may be transported straight through the decoupler in some embodiments. Thus, a user may insert container 310 in one of side of the decoupler, and the container may be released, or ejected, on the other side. One or both sides of the decoupler may be connected to another device or apparatus that handles the processed container. For example, a conveyor belt may be connected to the decoupler to take the output containers back to a warehouse or other storage facility. As another example, a device (such as a conveyor) may automatically feed containers into the decoupler for processing, if desired.

Transport chassis 312 may expose container 310 to one or more magnetic forces. These magnetic forces may result from a magnetic source within the decoupler or one or-more external magnetic sources. For example, in one embodiment the decoupler contains magnets 604 (FIG. 6) conveniently positioned within the processing path of container 310. These electromagnets may activate or deactivate a security tag, such as an EAS tag, lock the container, unlock the container, or perform any other suitable action (e.g., completely or partially wipe a magnetic storage medium associated with container 310). For example, container 310 may be associated with a benefit denial device. In order for the asset in container 310 to provide a benefit to the user, security or product activation information must be written to a device associated with the asset. Upon processing container 310, the decoupler may automatically blank or erase a magnetic storage medium containing such security or activation information and rewrite the information as appropriate. The magnetic field may be used for other processing actions as well. For example, container 310 may include an internal locking member which is configured to be moved by a magnetic force between a locked position and an unlocked position. By exposing container 310 to an appropriately oriented magnetic field, the decoupler may lock or unlock container 310. In some embodiments, containers are always locked upon entering transport chassis 312 and then locked or unlocked depending on the particular processing sequence executed by the decoupler.

Optical sensor 304 may verify or confirm the processing or security status of container 310 at any convenient time. For example, in one embodiment before the decoupler ejects container 310, optical sensor 304 attempts to verify the container's security status. In some embodiments, optical sensor 304 may detect electromagnetic radiation reflected off reflective tag 205 (FIG. 2). This radiation may be include infrared ("IR"), ultra-violet ("UV"), visible light, or any other suitable frequency of electromagnetic radiation. Container 310 may include a portion configured to close an optical or opto-electrical circuit with optical sensor 304 in one position while opening the optical circuit in another position. In some embodiments, optical sensor 304 detects the intensity of reflected radiation only. In other embodiments, optical sensor 304 detects the intensity and/or the frequency of reflected radiation (e.g., the color of reflected visible light). The position of the portion of container 310 that reflects the radiation may be indicative of the security status of container 310. This security status may indicate that container 310 is locked or unlocked.

During movement of container 310, an EAS tag may be deactivated, a barcode or other optical tag may be optically scanned, and/or one or more RFID tags may be read, written to, or killed. When container 310 enters the RFID or optical field of the decoupler, the decoupler may interrogate the container and/or the asset in the container to authenticate a valid transaction. For example, in one embodiment, passive RFID tags associated with the asset and the container are interrogated. The decoupler may verify whether the correct asset is in the correct container and validate the transaction using any other available information from transaction management facility 220 (FIG. 2). If the transaction is confirmed, the decoupler may energize conveyor assembly 308 and accept container 310. The decoupler may then release a solenoid arm, which may block the container's processing path, to allow case to advance into decoupler assembly.

Once in the assembly, a magnetic field may lock a locking bar internal to container 310. The container may then be moved to rear contact switch 314, which signals a motor to reverse direction of conveyor assembly 308. At this point, container 310 may begin to exit the transport chassis. The container's locking bar is again affected by a magnetic field, which may unlock container 310. Container 310 may then show a green "unlocked" icon in a lock indicator window on the container. When the lock indicator window passes optical sensor 304, electromagnetic radiation may be reflected from a portion of container 310 and detected by optical sensor 304. LED signals 306 may then flash to indicate successful unlocking of container 310. In some embodiments, other suitable output devices or mechanisms are used to indicate the successful unlocking of container 310. For example, a display screen or speaker may be integrated into the decoupler to allow multimedia output as well as user input.

Finally, when container 310 passes contact switch 302, conveyor assembly 308 may discontinue moving the container. Contact switch 304, like rear contact switch 314, may include any switch, sensor, or scanner, including a position sensor, that detects or reads the position of container 310. Once the processing of the container is complete and the container is ejected from the processing path, the user may remove the processed container from the decoupler.

In rental store and library environments, products rented or borrowed must be returned. In order to help speed the process of returning these items, a coupling embodiment of the invention may be used. In these embodiments, a container may pass all the way through the decoupler, locking the case and the media inside while receiving asset return information, which may include inventory information. This embodiment may be used in any type of stocking situation where individual assets are scanned for inventory, such as in the video rental industry, the library system and the pharmaceutical industry (for example, a retail pharmacy may stock a drug or other item by scanning a container, writing information to an RFID tag on the container, and locking the container, thus securing the drug or other item inside). The coupling embodiment may transport a container with an asset, receive information from the asset or from the container, and act upon the information. The decoupler may process the asset in a number of ways, including, for example, reading from, writing to, or killing one or more RFID tags associated with the asset and/or the lockable container, activating or deactivating an EAS tag associated with the asset and/or the lockable container, and locking or unlocking the container. In addition, the decoupler may connect to network resources, such as inventory information, asset management information, or stored data to further process or validate the asset.

A user may return a rental or retail item in a lockable container showing a green "unlocked" icon. This icon may indicate that the locking bar in the container is in the unlocked position. The user may insert the container into the decoupler in the appropriate orientation. In one embodiment, the user inserts the container with the indicator on the right side of the container with the container spine on left.

Information reception and/or transmission may begin when, for example, the container enters the RFID reader or optical field of the decoupler. This may cause conveyor assembly 308 to begin transporting the container. While in transport, an EAS tag may be activated, a barcode may be optically scanned, and/or an RFID tag may be read, written to, or killed. At some point, container 310 may trigger a contact switch, which recognizes the position of the container and interrogates a passive RFID tag associated with the container and/or the asset in the container to authenticate the transaction and to credit its return to the user. Authenticating the transaction may include matching the asset with container 310 and/or connecting to stored data or transaction management facility 220 (FIG. 2) to determine that the container is eligible for processing.

If the transaction is authenticated, the decoupler may energize conveyor assembly 308 and release a solenoid arm, which blocks the processing path, to allow the container to advance straight through the clear processing path. The container may be exposed to one or more magnetic forces, causing the locking bar within the container to be affected, which may lock the container. The container then is transported out the rear of the decoupler. Optionally, a storage bin may hold processed containers at the rear of the decoupler.

Figure 4:
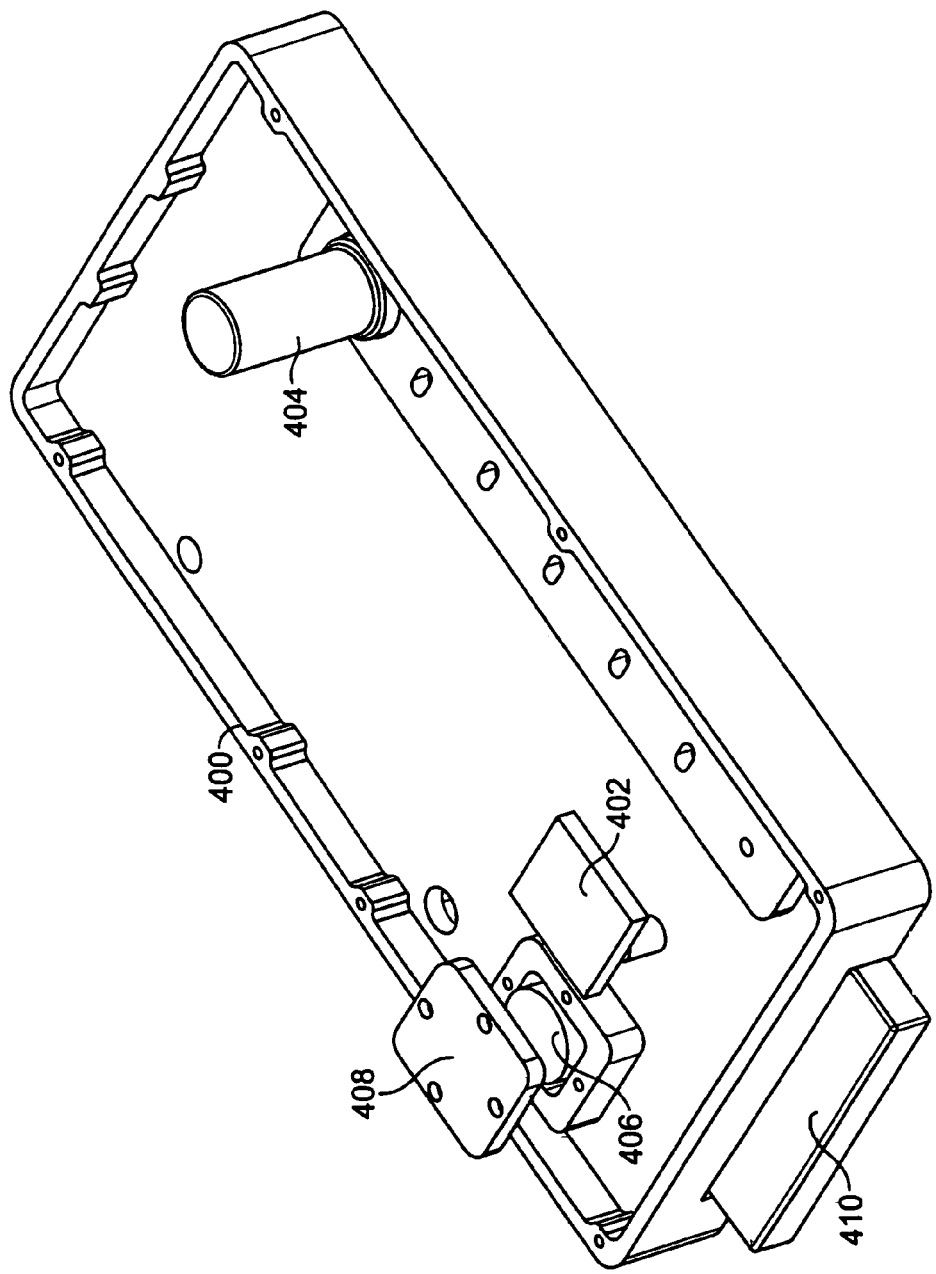
FIG. 4 is a simplified bottom view of the transport chassis of the decoupler of FIG. 2 in accordance with one embodiment of the invention.

FIG. 4 shows a bottom view of the illustrative transport chassis of FIG. 3 in accordance with one embodiment of the invention. Transport chassis 400 may include one or more magnets 406. In some embodiments, magnets 406 are permanent magnets. In other embodiments, magnets 406 are electromagnets. Magnets 406 are positioned in such a way so as to create a magnetic force configured to lock and/or unlock container 410 as it is transported through transport chassis 400. Magnets 406 may be switched on and off at appropriate times via electric current.

Magnet cover 408 may protect or shield other circuitry in the decoupler from being exposed to the magnetic field created by magnets 406. Antenna 402 may be any suitable device which receives or radiates radio waves, including RF waves. Antenna 402 may be combined or connected to RFID transceiver 506 (FIG. 5) to form an RFID reader. Motor 404, which may be connected to a power source (not shown), may power the container transport assembly.

Figure 5:
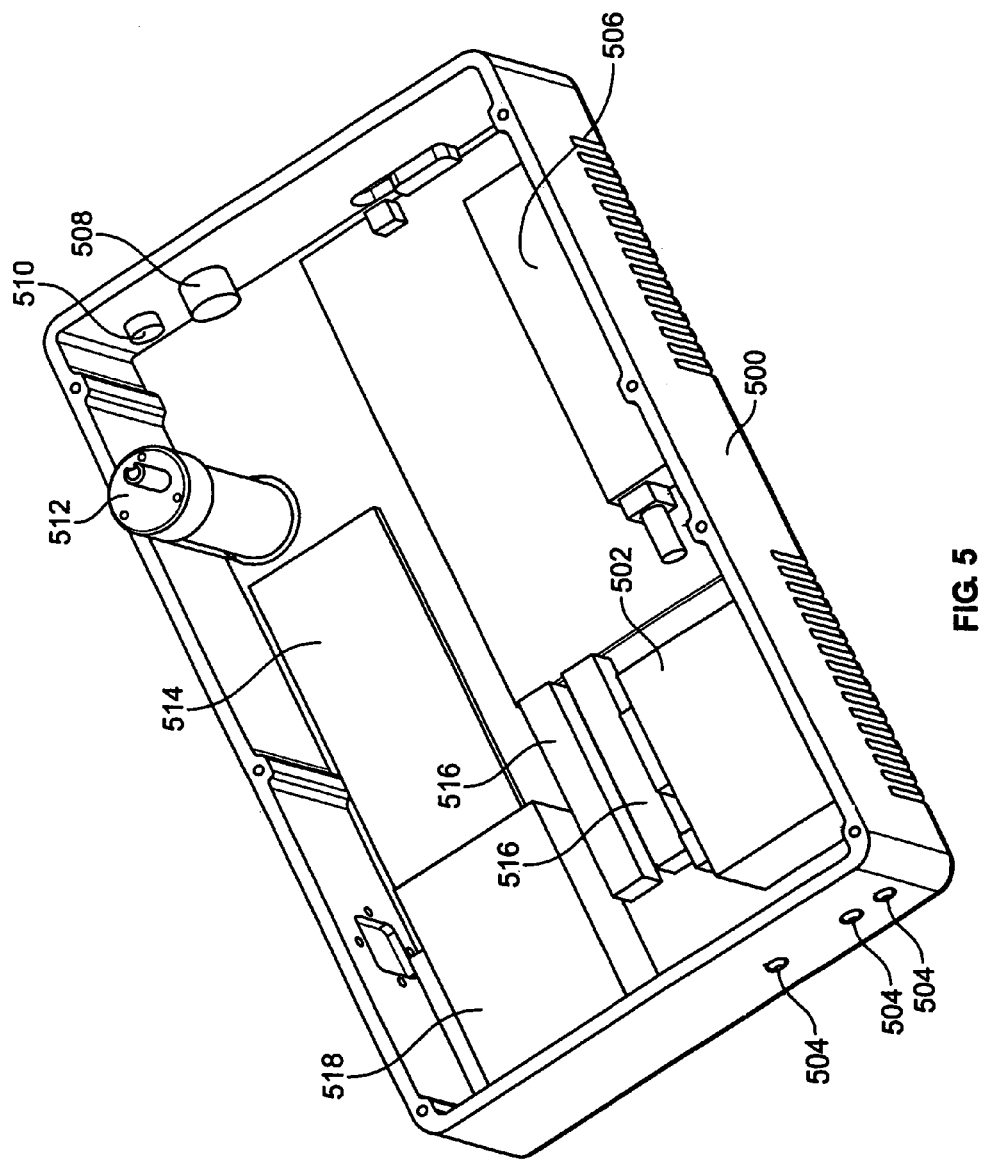
FIG. 5 is a simplified top view of the main chassis of the decoupler of FIG. 2 in accordance with another embodiment of the invention.

FIG. 5 shows a top view of an illustrative main chassis. Programmable logic controller 518 may coordinate some or all of the decoupler actions. For example, programmable logic controller 518 may control the operation of motor 512, micro relay board 514, RFID transceiver 506, and LED signals 504, in order to effect various decoupler processing actions. Power terminal 508 may provide external electrical power to transformer 502, which may then power motor 512, micro relay board 514, programmable logic controller 518, and various other decoupler components. Fuse 510 may protect the decoupler components from electrical surges from power terminal 508 and may be replaceable. Terminal blocks 516 may separate transformer 502 from micro relay board 514 and programmable logic controller 518 to reduce unwanted electrical or magnetic interference. Components shown in FIG. 5 may be shielded, if suitable, to avoid electromagnetic interference.

Figure 6:
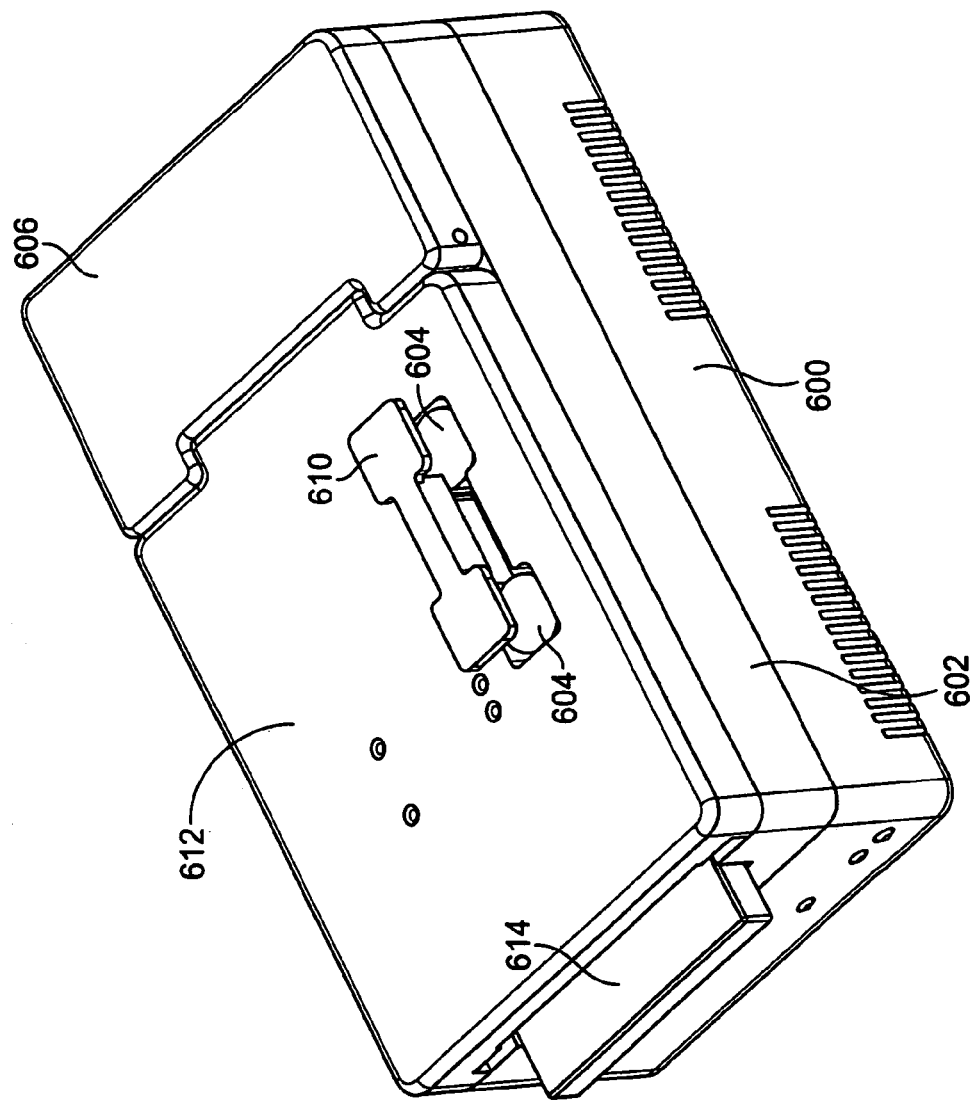
FIG. 6 is a simplified diagram of the decoupler assembly in accordance with another embodiment of the invention.

FIG. 6 shows an illustrative decoupler assembly. The decoupler assembly may include transport chassis 602 and main chassis 600. In some embodiments, container 614 may be inserted into transport chassis 602 to begin the processing sequence. In other embodiments, container 614 is brought within the RFID or optical range of the assembly to begin the processing sequence. The top of transport chassis 602 may include flip cover 612 to simplify access to internal components. Flip cover 612 may include magnet cover 610, which may allow access to magnets 604. Thus, magnets 604 may be replaced by removing magnet cover 610. Top cover 606 may be connected to flip cover 612 and may also be pivoted up to allow access to various components of the decoupler.

Figure 7:
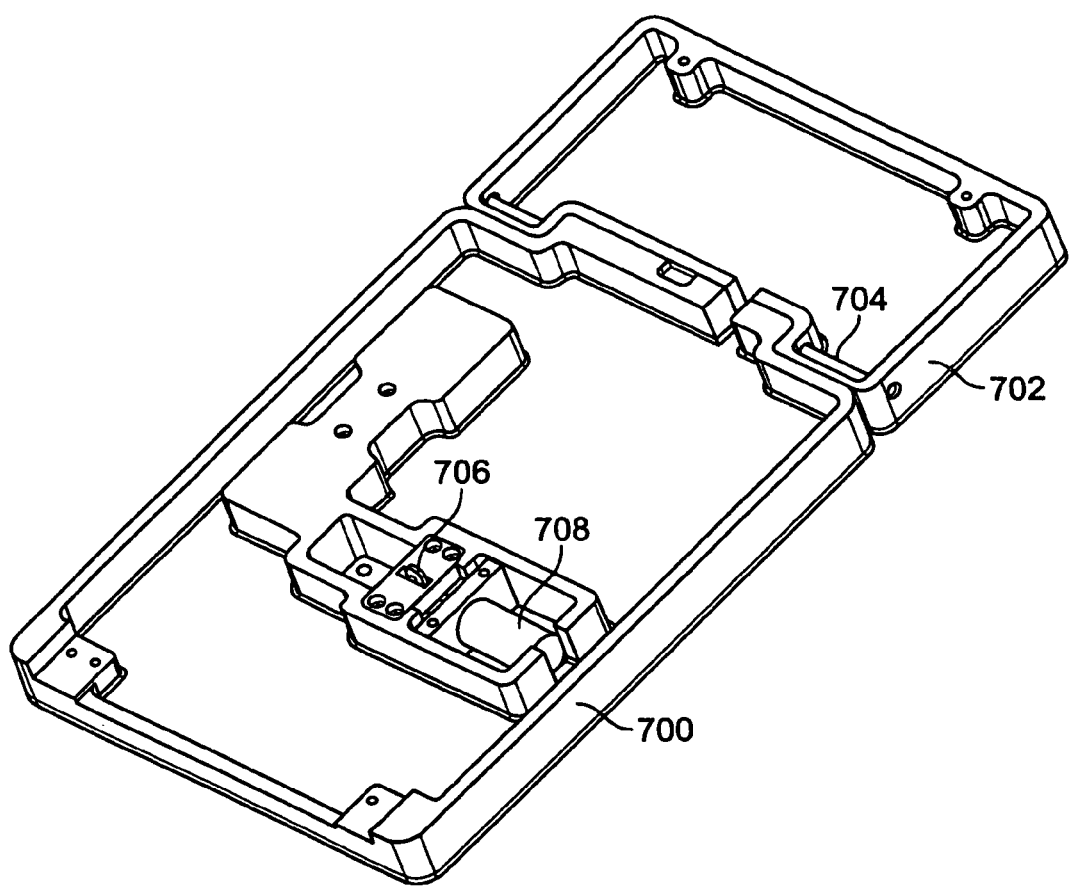
FIG. 7 is a simplified bottom view of the flip cover of the decoupler assembly shown in FIG. 6 in accordance with another embodiment of the invention.

FIG. 7 shows a bottom view of illustrative flip cover 700. Hinge pin 704 allows flip cover 700 to pivot about the pin. This allows access to the decoupler components under flip cover 700. In some embodiments, top cover 702 may also pivot about hinge pin 704. In other embodiments top cover 702 is fixed and not configured to pivot. Solenoid 708 may be positioned in flip cover 700 and may be connected to an arm or stop bar 706 that prevents access all the way into the container processing path. In some embodiments, stop bar 706 may selectively impede the processing passageway. In these embodiments, stop bar 706 may be released and removed from the processing path by solenoid 708 based on several factors, including the processing status of the container, the presence of an authenticated container within RFID or optical field range, or any other suitable factor.

Figure 8:
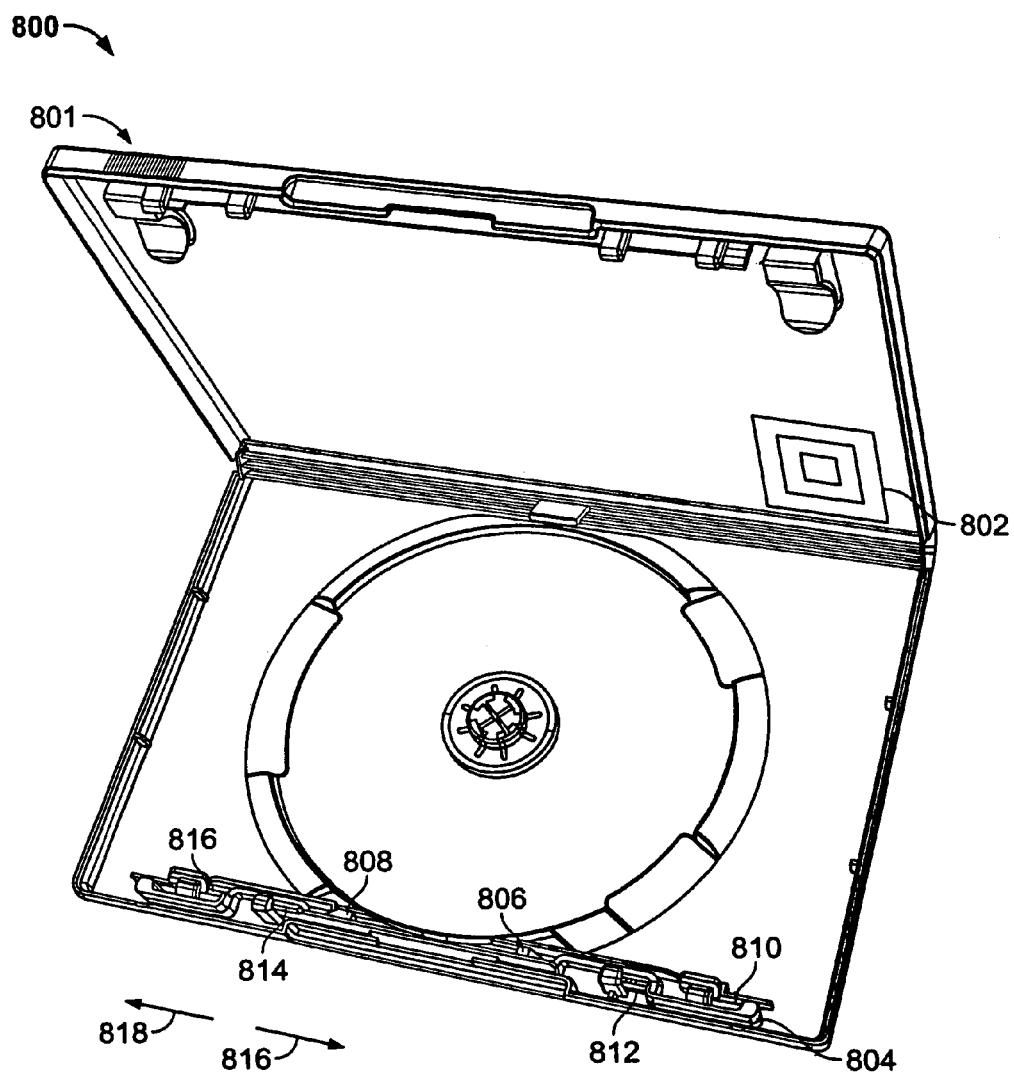
FIG. 8 is a diagram of another illustrative container for use with the decoupler assembly of FIG. 6 in accordance with another embodiment of the invention.

FIG. 8 shows illustrative container 800 for use with the decoupler assembly of FIG. 3. Container 800 may comprise a DVD or CD container. Container 800 includes a first cover and a second cover joined at a spine. The first and second covers may include a plurality of loops that interact with locking member 804 to lock container 800 in the closed position. Locking member 804 is inserted into container 800 so that it is capable of sliding in directions 818 and 816 into the locked and unlocked positions, respectively.

Locking member 804 may include molded spring arms 806 and 808 which are, as is more fully described in U.S. Patent Application Publication No. 2004/0129587, used to prevent locking member 804 from sliding into the unlocked position when locked and into the locked position when unlocked. It should be noted that spring arms 806 and 808 may take on any other suitable arrangements so long as they meet the objectives of the present invention. For example, for locking member 804, molded spring arms 806 and 808 may be metal leaf springs (not shown) that are included as part of the second cover of container 800, rather than as part of locking member 804.

Locking member 804 includes locking tabs 810, 812, 814, and 816 that interlock with adjacent corresponding loops formed on the other cover of container 800 to lock the container in the closed position. Various loops may be disposed on the first cover and the second of container 800. FIG. 8 is intended to show one illustrative arrangement. The loops may be disposed on the second cover of container 800 so that when container 800 is in the closed position, the loops from both covers sit in an adjacent relationship. Locking tabs 810, 812, 814, and 816 are constructed and arranged to at least partially sit within the corresponding loops when locking member 804 is in the unlocked position. This allows the locking tabs of locking member 804 to more easily slide into engagement with the loops of container 800 when the container is in the closed position.

Locking member 804 is designed to be used with the decoupler of the present invention or an external manual magnetic key decoupler. Either of these devices may selectively lock and/or unlock container 800. In particular, a manual magnetic key decoupler or the decoupler assembly of FIG. 3 may selectively position internal locking member 804 into either the locked position or the unlocked position. For this purpose, internal locking member 804 may include magnetically attractable portions formed therein for magnetically coupling to at least one magnet arrangement of the magnetic key or decoupler. For example, metallic inserts may be inserted at opposite ends of locking member 804, and metallic inserts may be inserted into spring arms 806 and 808.

The locking member of container 800 may be used with a container for securing assets. Such assets may include, for example, storage media (e.g., DVDs, CDs, video games, memory cards or any other suitable storage media), jewelry, pharmaceutical products, razor blades, printer cartridges, or any other item of value. The lockable container of the present invention may also be used to secure items such that others are prevented from accessing the item, whether or not the item is of particular value. For example, the lockable container of the present invention may be used to secure violent or adult movies or video games in the home, such that children are unable to access the items.

Container 800 may also include RFID 802 on one or both of the first cover and the second cover. RFID tag 802 may be an active or passive tag. RFID tag 802 may also be disposed at various other locations on container 800, including, for example, on locking member 804, the container spine, or on the disc hub of container 800. In addition, in some embodiments, RFID tag 802 may be also located on the asset held with the container. For example, a DVD movie may have an RFID tag on the labeled surface of the DVD. This may be useful for verifying the presence of the asset in the container before processing the container. The decoupler of the present invention may read from, write to, or kill any of the aforementioned tags.

Container 800 may also induce optical tag 801, which in the illustrated embodiments is a barcode, but could include any machine-readable tag or indicia. For example, optical tag 801 may be a hologram, watermark, two-dimensional barcode, or any other printed, etched, or applied tag.

Figure 9:
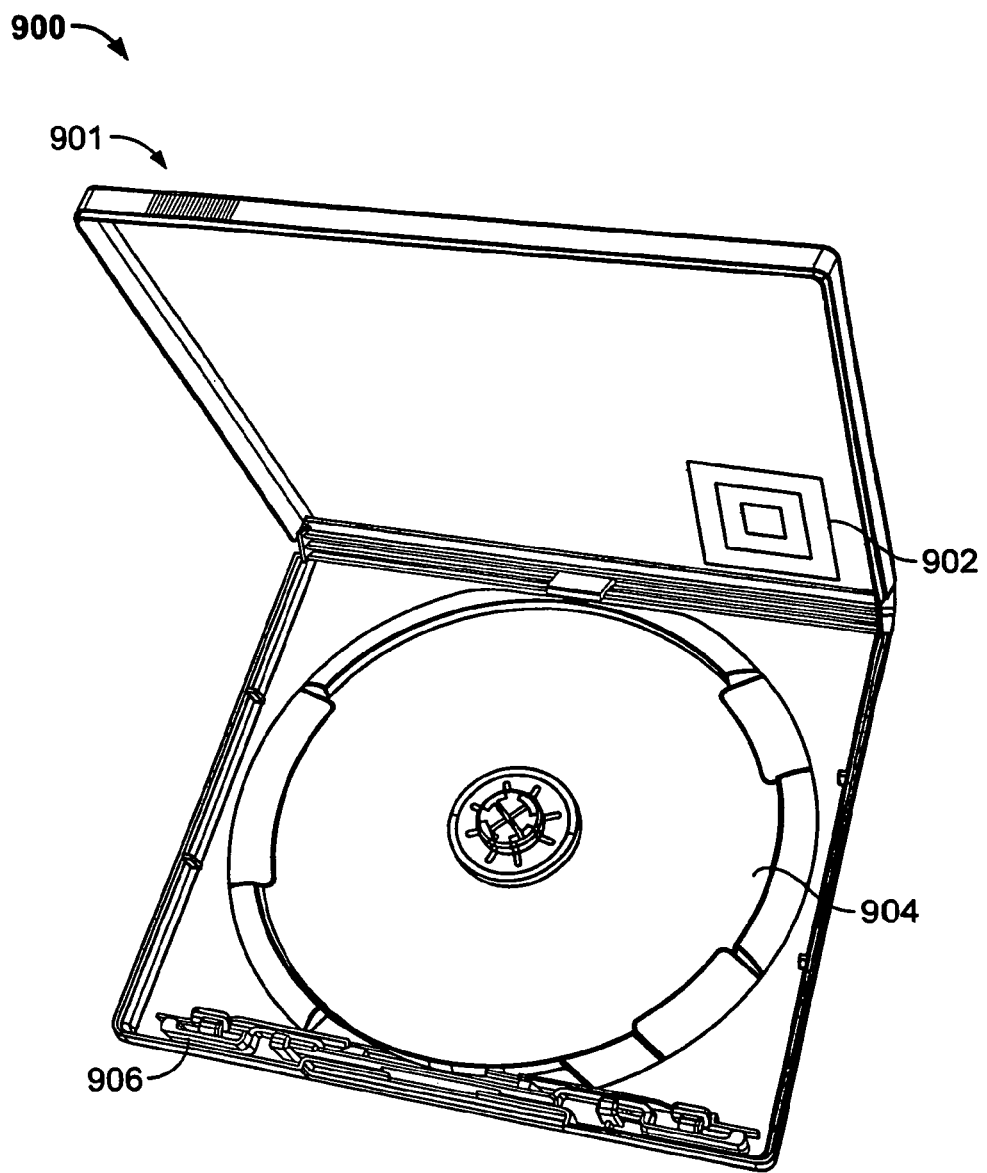
FIG. 9 is a diagram of yet another illustrative container for use with the decoupler assembly of FIG. 6 in accordance with another embodiment of the invention.

FIG. 9 shows another illustrative container for use with the decoupler of FIG. 3 in accordance with one embodiment of the invention. Container 900 may include one or more features shown in FIG. 8 in connection with container 800. Some embodiments of the decoupler may accept variable-sized containers. In some embodiments, the containers are a fixed width. For example, container 900 may be a traditional CD jewel case that has the same width as container 800 (FIG. 8). In some embodiments, the decoupler may accept variable-width containers. In these embodiments, the processing path may sense the size of the container and adjust the processing path according.

Container 900 may include one or more of RFID tag 902 and optical tag 901. RFID tag 902 may also be disposed at various other locations on container 900, including, for example, on locking member 904, the container spine, or in disc area 904. Container 900 may be configured to hold an asset, such as a CD, DVD, or other like media.

Figure 10A:
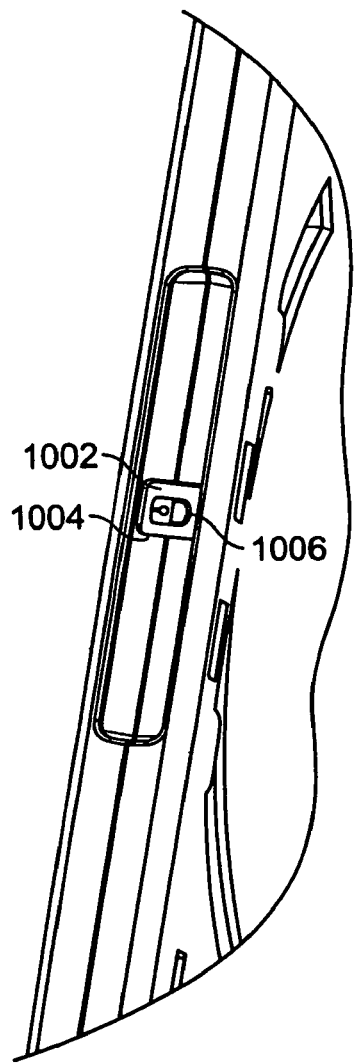
FIGS. 10A and 10B are diagrams of illustrative security status indicators of the containers of FIGS. 8 and 9 in accordance with one embodiment of the invention.
Figure 10B:
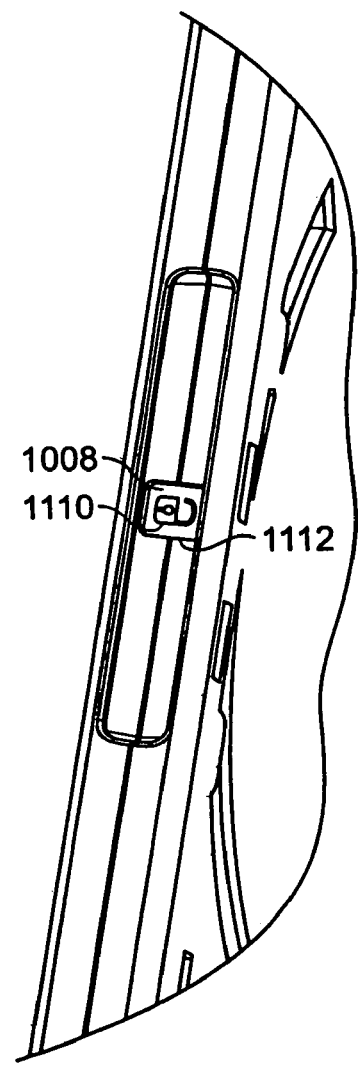

As shown in FIGS. 10A and 10B, a security status indicator may be displayed through status windows, such as windows 1004 and 1112 on the lockable container. The security status indicator may be indicative of the security status of the container. For example, status portion 1002 may indicate that the locking member is in the locked position. In this position, the lockable container may be locked in the closed position, preventing access to the asset within the container. The status information may be placed on status portion 1002 by any known method. When the locking member of the container is slid between the locked and unlocked positions, the appropriate status information corresponding to the position of the locking member, for example, may appear through status windows 1004 and 1112 for a user to read. In one example, status portion 1002 may include a sticker that shows lock 1006. In some embodiments, lock 1006 is red in color. When the locking member of the container is moved to the unlocked position, status portion 1008 may show opened lock 1110 through status window 1112. In some embodiments, opened lock 1110 is green in color. In one embodiment, at least a portion of status portion 1002 and/or status portion 1008 is treated with reflective ink. In this embodiment, incident light on the status portion may be reflected at the same or different wavelength. For example, incident visible light may be reflected as green light when the locking member is in the unlocked position, while incident visible light may be reflected as red light when the locking member is in the locked position.

Figure 11A:
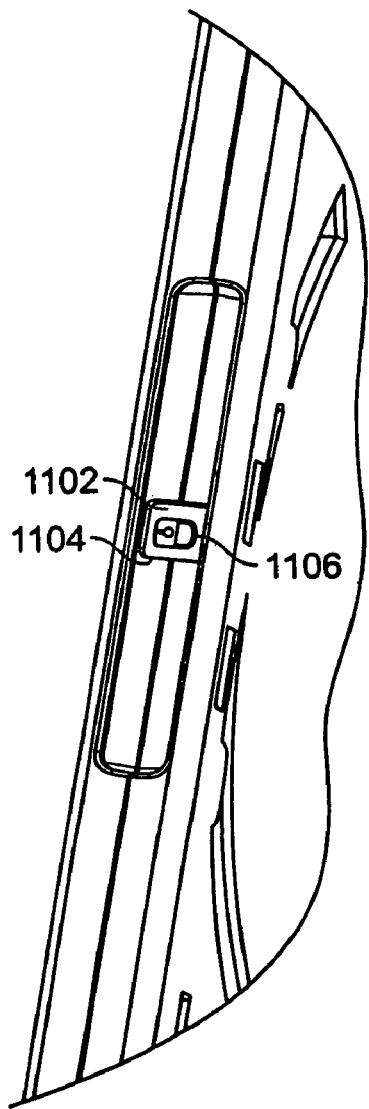
FIGS. 11A and 11B are diagrams of illustrative reflective security status indicators of the containers of FIGS. 8 and 9 in accordance with one embodiment of the invention.
Figure 11B:
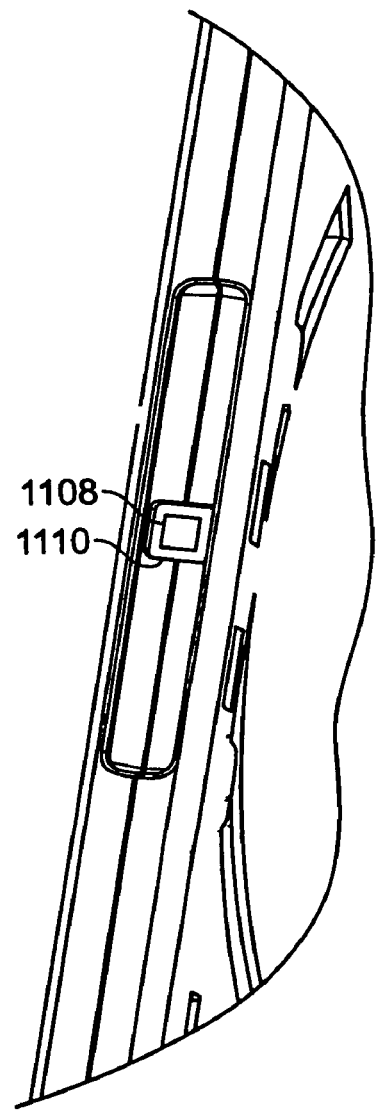

FIGS. 11A and 11B show illustrative reflective status portions 1104 and 1108 through status windows 1104 and 1110, respectively. Status portion 1102 may contain a reflective icon, such as locked icon 1106, and may indicate the security status of the container. When the container is unlocked (e.g., when the locking member is moved to the unlocked position), status portion 1108 may include a security status indicator configured to close an optical circuit between the indicator and an optical sensor. For example, status portion 1108 may include a reflective foil, reflective film, reflective tape, or other suitable material with a desired (or known) reflectivity.

In one embodiment, status portion 1108 may reflect all incident electromagnetic radiation in a portion of the electromagnetic spectrum to an optical sensor, thereby closing an optical or opto-electrical circuit. In other embodiments, status portion 1108 may reflect electromagnetic radiation of a certain wavelength or range of wavelengths only. For example, status portion 1108 may reflect only visible green light when the unlocked security status indicator is showing and reflect only visible red light when the locked security status indicator is showing. The status indicators of FIGS. 11A and 11B are merely exemplary. Any other status indicator capable of being detected, scanned, or read by an optical sensor may be used in place of the depicted status indicators.

Figure 12:
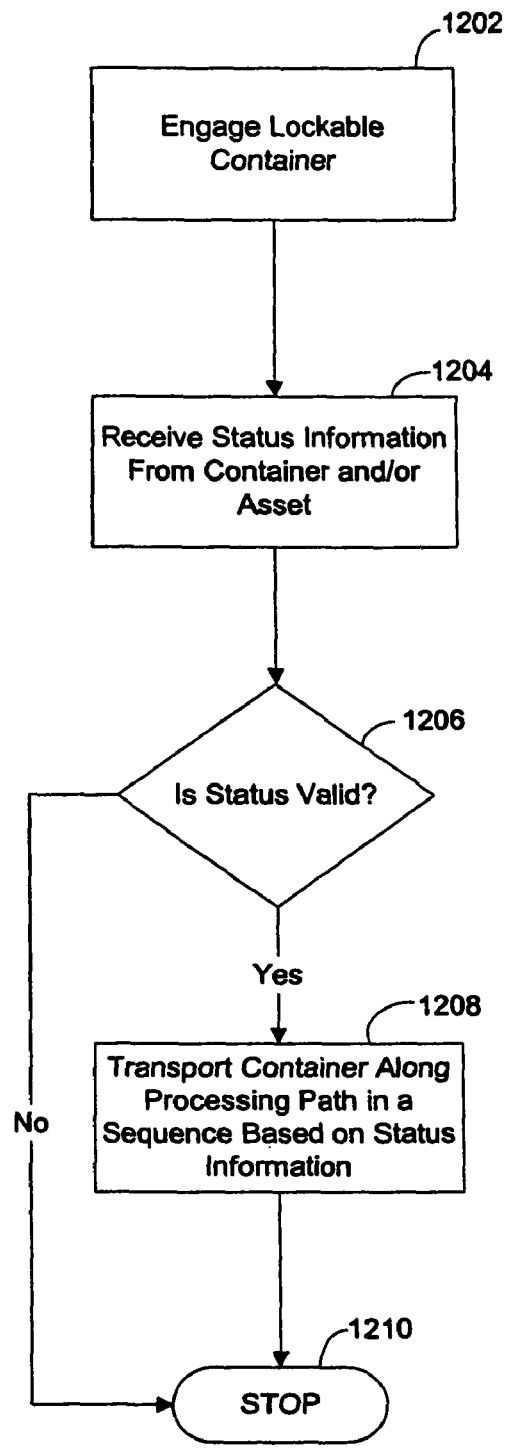
FIG. 12 is a flow chart of an illustrative process for processing an item in accordance with one embodiment of the invention.

FIG. 12 shows illustrative process 1200 for processing an item in accordance with one embodiment of the invention. At step 1202, the decoupler may engage the lockable container. Typically, a transfer or transport assembly, such as conveyor assembly 308 of FIG. 3, engages the container. At step 1204, the decoupler receives status information from at least one of the container and the item within the container. For example, RFID tags located on both the container and the item could be interrogated when the container is brought within RFID range of the decoupler. As another example, status information from an optical tag could be scanned, read, or otherwise recognized by an optical scanner or sensor at step 1204. At decision block 1206, via the received status information. The decoupler may connect to any available network resource, server, or content provider to authenticate the transaction. At this stage, the decoupler may link to price information, customer data, and any other related purchase or rental information. For example, if the decoupler recognized the container as a valid container and the asset as a valid asset, the decoupler may transport the container at step 1208. The transport sequence may be based on the received status information from step 1204. Step 1208 may include moving the container along a processing path and altering the status information associated with the container and/or the asset. After the item is transported at stage 1208 or if the transaction status could not be validated at decision block 1206, the illustrative process may stop at step 1210.

In practice, one or more steps shown in process 1200 may be combined with other steps, performed in any suitable order, performed in parallel —e.g., simultaneously or substantially simultaneously —or deleted. For example, step 1204 of receiving status information may be performed before engaging the container at step 1202. For example, when the container enters optical or RFID range of the decoupler, the decoupler may receive information from the container and/or the asset within the container.

Figure 13:
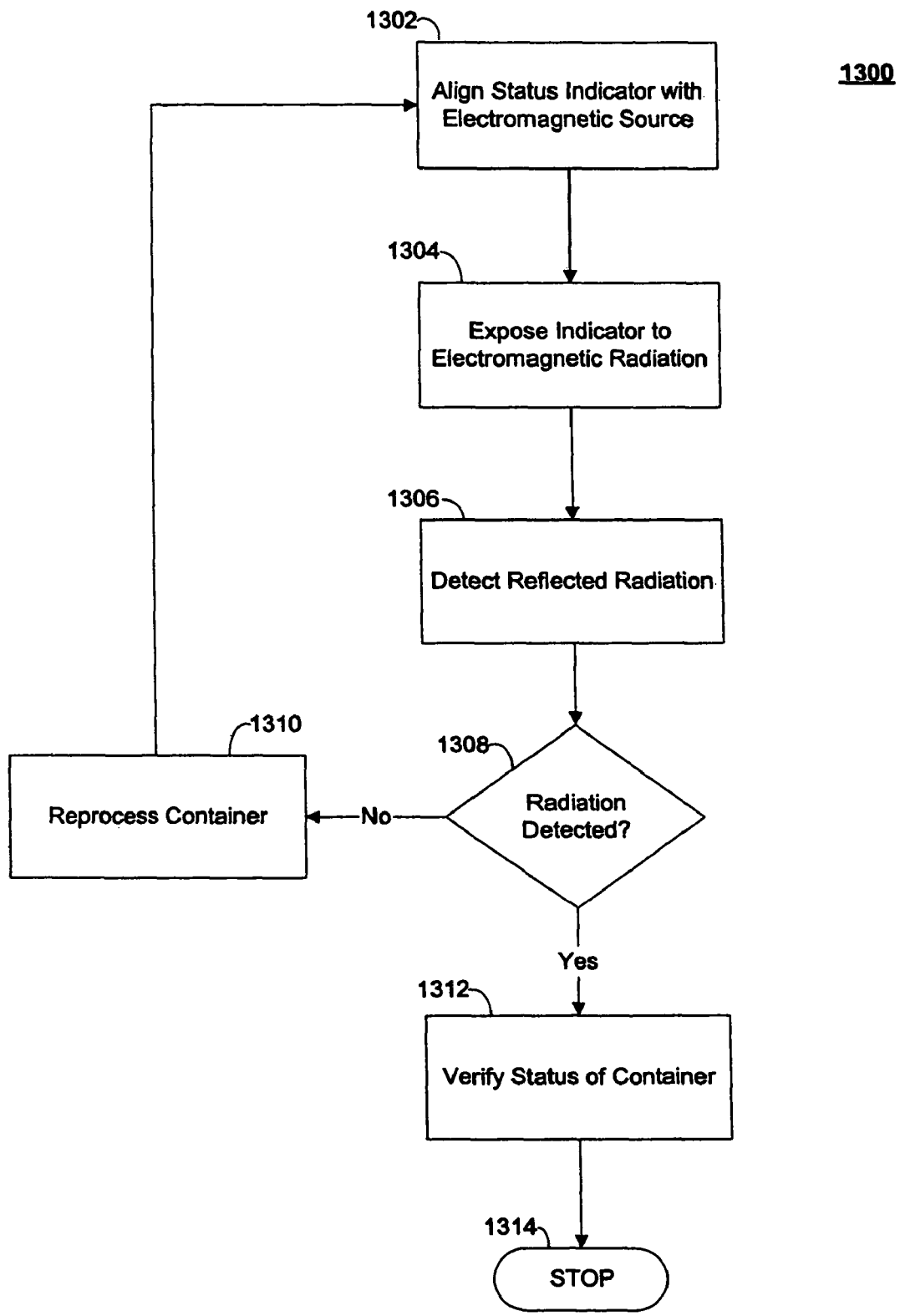
FIG. 13 is a flow chart of an illustrative process for verifying the security status of a container in accordance with one embodiment of the invention.

FIG. 13 shows illustrative process 1300 for verifying the security status of a lockable container in accordance with one embodiment of the invention. At step 1302, a security status indicator associated with the lockable container may be aligned with an electromagnetic radiation source, such as a visible light source. At step 1304, the indicator may be exposed to the radiation source. At step 1306, a sensor or some other detector may detect the reflected radiation from the security status indicator. The security status indicator may include a first position that closes an optical circuit between the indicator and the sensor and a second position that opens the optical circuit. If the optical circuit is closed at decision block 1308, this may indicate to the decoupler that the container has been successfully processed and unlocked. The security status of the container is thus verified at step 1312. If the optical circuit is open at decision block 1308, in some embodiments the decoupler may attempt to reprocess the container at step 1310. At this step, the container may be transported through at least a portion of the processing path and once again aligned with the electromagnetic radiation source at step 1302. The illustrative process may stop at step 1314 after verifying the status of the container.

In practice, one or more steps shown in process 1300 may be combined with other steps, performed in any suitable order, performed in parallel —e.g., simultaneously or substantially simultaneously —or deleted.

Figure 14:
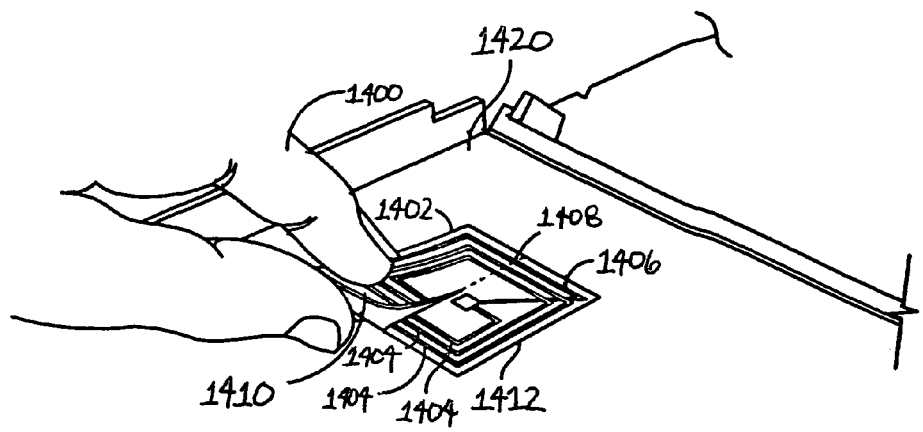
FIGS. 14 and 15 show a user rendering a tag associated with a lockable container inoperable by tearing the tag in accordance with one embodiment of the invention.

FIG. 14 shows user hand 1400 rendering tag 1402 inoperable by tearing tag 1402 along perforation 1408 to destroy coils 1404 of antenna 1406. Portion 1410 of tag 1402 may be detached from enclosure member 1420. Portion 1412 of tag 1402 may remain attached to enclosure member 1420. In some embodiments, by tearing tag 1402 along perforation 1408, the user interrupts electrical communication between the antenna and a storage device associated with tag 1402. This may effectively deactivate, or kill, the electrical circuit or tag.

Figure 15:
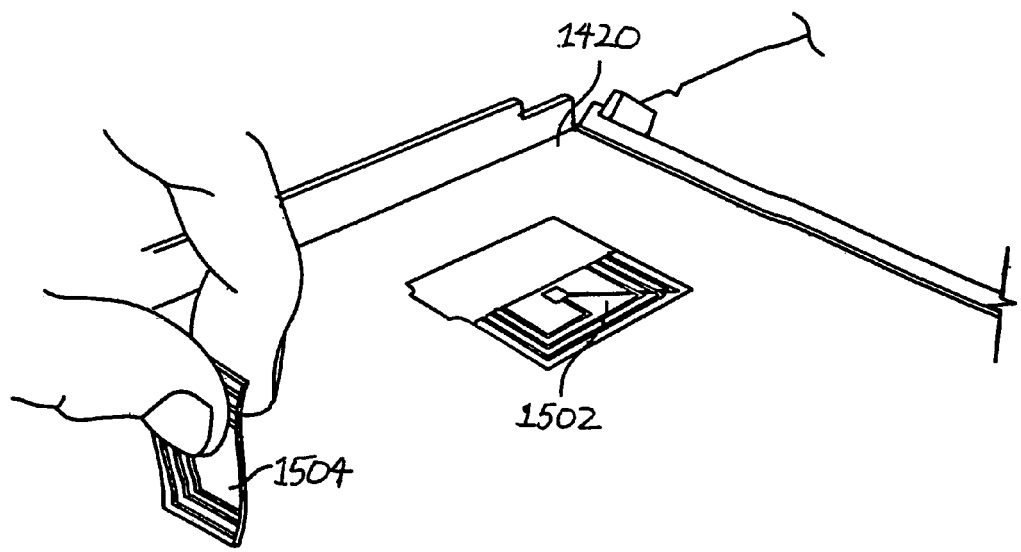

FIG. 15 shows portion 1504 removed from enclosure member 1420 and portion 1502 remaining attached to enclosure member 1420. In some embodiments, all of tag 1402 (FIG. 14) may be removed from enclosure member 1420.

It will be noted that all of the features described above in connection with the decoupler of the invention may be applied to various types of containers and various types of assets in addition to the containers and assets described. The above described embodiments of the present invention are presented for the purposes of illustration and not of limitation, and the present invention is limited only by the claims which follow.

What is claimed is:

1. A method for verifying a security status of a lockable container using a container processing assembly, the lockable container having a security status indicator configured to close an optical circuit between the indicator and an optical sensor in a first position and open the optical circuit in a second position, the method comprising:
   aligning the security status indicator with an electromagnetic radiation source within the container processing assembly;
   exposing the security status indicator to the electromagnetic radiation source;
   detecting reflected electromagnetic radiation from the security status indicator; and
   determining, from the detected reflected electromagnetic radiation, whether the optical circuit is open or closed.

2. The method of claim 1 wherein detecting the reflected electromagnetic radiation comprises detecting an intensity of the reflected electromagnetic radiation.

3. The method of claim 1 wherein the electromagnetic radiation comprises visible light.

4. The method of claim 3 wherein detecting the reflected electromagnetic radiation comprises detecting a color of the visible light.

5. The method of claim 1 wherein aligning the security status indicator comprises moving the lockable container along a processing path.

6. The method of claim 5 wherein the processing path is mechanical.

7. The method of claim 1 wherein the security status indicator comprises reflective foil.

8. The method of claim 1 wherein the security status indicator comprises reflective tape.

9. The method of claim 1 wherein the security status indicator comprises reflective ink.

10. The method of claim 1 wherein exposing the security status indicator to the electromagnetic radiation source comprising shining a laser on the indicator.

11. The method of claim 1 wherein exposing the security status indicator to the electromagnetic radiation source comprises shining a light emitting diode on the indicator.

12. A method for verifying a security status of a lockable container using a container processing assembly, the lockable container having a security status indicator configured to close an optical circuit between the indicator and an optical sensor in a first position and open the optical circuit in a second position, the security status indicator indicative of a locked/unlocked status of the lockable container, the method comprising:
  receiving the lockable container at the container processing assembly;
  aligning the security status indicator with an electromagnetic radiation source within the container processing assembly;
  exposing the security status indicator to the electromagnetic radiation source;
  detecting reflected electromagnetic radiation from the security status indicator;
  determining, from the detected reflected electromagnetic radiation, whether the optical circuit is open or closed; and
  automatically locking or unlocking the lockable container based, at least in part, on the determination of whether the optical circuit is open or closed.

13. The method of claim 12 wherein detecting the reflected electromagnetic radiation comprises detecting an intensity of the reflected electromagnetic radiation.

14. The method of claim 12 wherein the electromagnetic radiation comprises visible light.

15. The method of claim 14 wherein detecting the reflected electromagnetic radiation comprises detecting a color of the visible light.

16. The method of claim 12 wherein aligning the security status indicator comprises the step of moving the lockable container along a processing path.

17. The method of claim 16 wherein the processing path is mechanical.

18. The method of claim 12 wherein the security status indicator comprises at least one of: reflective foil, reflective tape, and reflective ink.

19. The method of claim 12 wherein exposing the security status indicator to the electromagnetic radiation source comprises shining a laser on the indicator.

20. The method of claim 12 wherein exposing the security status indicator to the electromagnetic radiation source comprises shining a light emitting diode on the indicator.

* * * * *